United States Patent
King

(10) Patent No.: US 11,615,577 B2
(45) Date of Patent: Mar. 28, 2023

(54) INTERSECTION TESTING IN A RAY TRACING SYSTEM USING SCALED MINIMUM AND MAXIMUM CULLING DISTANCES

(71) Applicant: Imagination Technologies Limited, Kings Langley (GB)

(72) Inventor: Rostam King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/701,922

(22) Filed: Mar. 23, 2022

(65) Prior Publication Data

US 2022/0343578 A1 Oct. 27, 2022

(30) Foreign Application Priority Data

Mar. 23, 2021 (GB) .................................... 2104066

(51) Int. Cl.
*G06T 15/06* (2011.01)
*G06T 15/00* (2011.01)
*G06T 15/40* (2011.01)

(52) U.S. Cl.
CPC ............ *G06T 15/005* (2013.01); *G06T 15/06* (2013.01); *G06T 15/40* (2013.01); *G06T 2210/21* (2013.01)

(58) Field of Classification Search
None
See application file for complete search history.

(56) References Cited

U.S. PATENT DOCUMENTS 8,284,188 B1 10/2012 Lauterbach et al.
8,411,088 B2 4/2013 Sevastianov et al.
(Continued)

FOREIGN PATENT DOCUMENTS

CN 101192309 A 6/2008
CN 101527052 A 9/2009
(Continued)

OTHER PUBLICATIONS

"Ray tracing primitives"; https://www.cl.cam.ac.uk/teaching/1999/AGraphHCI/SMAG/node2.html#SECTION00023100000000000000.
(Continued)

*Primary Examiner* — Andrew G Yang
(74) *Attorney, Agent, or Firm* — Potomac Law Group, PLLC; Vincent M DeLuca

(57) ABSTRACT

A method and intersection testing module in a ray tracing system for determining whether a ray intersects a 3D axis-aligned box that represents a volume defined by a front-facing plane and a back-facing plane for each dimension. Scaled inverse ray components are determined and a scaled minimum culling distance is determined using a result of multiplying an unscaled minimum culling distance for the ray by a predetermined magnitude. Scaled intersection distances to the planes defining the box are determined using scaled inverse ray components. The largest of the determined scaled intersection distances to a front-facing plane of the box is identified. The smallest of the determined scaled intersection distances to a back-facing plane of the box is identified. It is determined that the ray intersects the box if all of three determinations are satisfied, and it is determined that the ray misses the box if one or more of the three determinations are not satisfied.

20 Claims, 9 Drawing Sheets

(56) References Cited

U.S. PATENT DOCUMENTS

| | | | |
|---|---|---|---|
| 2009/0284524 A1 | 11/2009 | Shearer et al. | |
| 2010/0231589 A1 | 9/2010 | Salsbury et al. | |
| 2014/0015835 A1* | 1/2014 | Akenine-Moller | G06T 15/005 345/426 |
| 2014/0306959 A1 | 10/2014 | Ozdas et al. | |
| 2015/0262408 A1 | 9/2015 | Lee et al. | |
| 2015/0379756 A1 | 12/2015 | Shin et al. | |
| 2016/0071312 A1 | 3/2016 | Laine et al. | |
| 2016/0071313 A1* | 3/2016 | Laine | G06T 15/08 345/419 |
| 2016/0110910 A1 | 4/2016 | Obert et al. | |
| 2018/0182158 A1 | 6/2018 | Karras et al. | |
| 2018/0365879 A1 | 12/2018 | Peterson et al. | |
| 2020/0193683 A1 | 6/2020 | Saleh | |
| 2021/0287428 A1* | 9/2021 | Woop | G06T 15/06 |
| 2022/0114780 A1 | 4/2022 | Barnard et al. | |
| 2022/0343584 A1 | 10/2022 | King | |

FOREIGN PATENT DOCUMENTS

| | | |
|---|---|---|
| CN | 102855655 A | 1/2013 |
| CN | 102947865 A | 2/2013 |
| CN | 109087384 A | 12/2018 |
| CN | 109509138 A | 3/2019 |
| CN | 109643461 A | 4/2019 |
| GB | 2584187 A | 11/2020 |

OTHER PUBLICATIONS

Havel et al; "Yet Faster Ray-Triangle Intersection (Using SSE4)"; IEEE Transactions on Visualization and Computer Graphics; vol. 16; No. 3; May/Jun. 2010; pp. 434-438.

Kay et al; "Ray Tracing Complex Scenes"; Computer Graphics; vol. 20; No. 4; 1986; p. 269-278.

Kensler et al; "Optimizing Ray-Triangle Intersection via Automated Search"; School of Computing; University of Utah; pp. 1-6.

Mahovsky et al; "Fast Ray-Axis Aligned Bounding Box Overlap Tests with Plücker Coordinates"; vol. 9; No. 1; pp. 35-46.

Möller et al; "Fast, Minimum Storage Ray/Triangle Intersection"; pp. 1-7.

Shevtsov et al; "Ray-Triangle Intersection Algorithm for Modern CPU Architectures"; Russia, Moscow, Jun. 23-27, 2007; pp. 1-7.

Smits; "Efficiency Issues for Ray Tracing"; University of Utah; Feb. 19, 1999; pp. 1-12.

Toth; "On Ray Tracing Parametric Surfaces"; Computer Graphics Development; Ford Motor Company; vol. 19 No. 3; 1985; San Francisco Jul. 22-26; pp. 171-179.

Williams et al; "An Efficient and Robust Ray-Box Intersection Algorithm"; Courses on ACM Siggraph; vol. 10; No. 1 pp. 55-60.

Woop et al; "Watertight Ray/Triangle Intersection"; Journal of Computer Graphics Techniques; vol. 2; No. 1; 2013; pp. 65-82.

Fabianowski et al., Compact BVH Storage for Ray Tracing and Photon Mapping, 2009 (Year: 2009).

Majercik et al., A Ray-Box Intersection Algorithm and Efficient Dynamic Voxel Rendering, 2018 (Year 2018).

* cited by examiner

INTERSECTION TESTING IN A RAY TRACING SYSTEM USING SCALED MINIMUM AND MAXIMUM CULLING DISTANCES

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. A "tree node" refers to a node which has pointers to other nodes in the hierarchical acceleration structure, i.e. a tree node has child nodes in the hierarchical acceleration structure. A "leaf node" refers to a node which has one or more pointers to one or more primitives, i.e. a leaf node does not have child nodes in the hierarchical acceleration structure. In other words, leaf nodes of the acceleration structure represent regions bounding one or more primitives in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. If more than one intersection is found for a ray then the closest of the intersection points to the rays origin (i.e. the first intersection that the ray encounters in the scene) may be identified and the ray may be determined to intersect at this identified closest intersection. It is possible that there may be multiple closest hits for a ray, and in this case some tie-break logic may be used to select one of the multiple closest hits to use as the identified closest intersection. For some types of rays, the closest intersection might not need to be identified. For example, when processing shadow rays, an indication that there is at least one intersection is sufficient, without determining which of the intersections is the closest, and some APIs may allow the traversal of an acceleration structure for shadow rays to be terminated in response to finding any intersection, to thereby reduce the number of intersection tests that need to be performed. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the alignment relative to the axes of the coordinate system is not predetermined.

A ray (r) can be defined as $r=O+Dt$ where $O$ is a vector which represents the ray origin, $D$ is a vector which represents the ray direction and $t$ represents a distance along the ray from the origin. According to one approach a ray can be tested against an axis-aligned box by finding, for each of the x, y and z dimensions, an interval of t for which the ray is between the two planes representing the sides of the box which are perpendicular to that dimension. This gives three intervals for values of t (one for the x dimension, one for the y dimension and one for the z dimension). If the intersection of these three intervals (itself an interval) is empty then the ray does not intersect the axis-aligned box; whereas if the intersection of these three intervals is not empty then the ray may intersect the axis-aligned box. This intersection testing method involves performing six tests to find the three intervals of t, and then a comparison to determine whether the intersection of those intervals is empty.

According to another approach, a ray can be tested against the edges of a box that form a 2D silhouette of the box from the viewpoint of the ray. If the ray passes on the inside of each of the silhouette edges, then it is determined that the ray intersects the box, whereas if the ray passes on the outside of one or more of the silhouette edges of the box then it is determined that the ray does not intersect the box. An AABB normally has 6 silhouette edges (depending upon the orientation of the AABB from the viewpoint of the ray), so this approach normally requires six tests to be performed.

The tests described above would determine whether an infinitely long line aligned with the ray would intersect the box. However, a ray is not typically infinite in length, and may have one or more valid intervals. For example, a ray may have some minimum distance and some maximum distance from the ray origin, which may be defined in terms of a minimum value of t (referred to as a minimum culling distance, $t_{min}$), and a maximum value of t (referred to as a maximum culling distance, $t_{max}$). Therefore, a minimum distance test may be performed to check that the minimum culling distance is not greater than a largest intersection distance to an intersection point of the ray with a box; and a maximum distance test may be performed to check that the maximum culling distance is not less than a smallest intersection distance to an intersection point of the ray with the box.

Since intersection tests of rays against shapes corresponding to the nodes of an acceleration structure, e.g. axis-aligned boxes, are performed many times, it can be beneficial to implement the functionality for performing these intersection tests in dedicated hardware modules, e.g. using fixed function circuitry, rather than implementing these intersection tests using software modules executed on general purpose processing units. Software implementations generally provide more flexibility because software is more easily altered after it is designed and/or created than hardware implementations are. However, hardware implementations generally provide more efficient implementations in terms of latency and power consumption, so if the desired functionality is known in advance, hardware implementations may be preferred over software implementations. When designing a hardware implementation of an intersection testing module which is configured for performing intersection testing there are generally competing aims of having: (i) a smaller size (i.e. smaller silicon area), (ii) a lower latency, and (iii) lower power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:

determining scaled inverse ray components $\rho_u$ and $\rho_v$, wherein $$\rho_u = \left|\frac{AD_w}{D_u}\right| \text{ and}$$

$$\rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector such that $|D_w| \geq |D_u|$ and $|D_w| \geq |D_v|$, and wherein A is a scalar value;

determining a scaled minimum culling distance, $t_{min,scaled}$, using a result of multiplying an unscaled minimum culling distance for the ray, $t_{min,unscaled}$, by the magnitude of $AD_w$;

determining a scaled maximum culling distance, $t_{max,scaled}$, using a result of multiplying an unscaled maximum culling distance for the ray, $t_{max,unscaled}$, by the magnitude of $AD_w$;

determining scaled intersection distances to the planes defining the box using the scaled inverse ray components;

identifying the largest of the determined scaled intersection distances to a front-facing plane of the box;

identifying the smallest of the determined scaled intersection distances to a back-facing plane of the box;

determining whether:
(i) the identified largest scaled intersection distance to a front-facing plane of the box is no greater than the identified smallest scaled intersection distance to a back-facing plane of the box;
(ii) the identified largest scaled intersection distance to a front-facing plane of the box is no greater than the scaled maximum culling distance, $t_{max,scaled}$; and
(iii) the identified smallest scaled intersection distance to a back-facing plane of the box is no less than the scaled minimum culling distance, $t_{min,scaled}$; and determining that the ray intersects the box if all of the three determinations (i) to (iii) are satisfied, and determining that the ray misses the box if one or more of the three determinations (i) to (iii) are not satisfied.

For example, A=1. The three determinations (i) to (iii) may be performed in parallel.

The box may represent a volume defined by a front-facing plane and a back-facing plane for each of the dimensions, u, v and w, of the three-dimensional axis-aligned box, wherein $b_{min,u}$ is a constant u component value of the front-facing plane for the u dimension, $b_{max,u}$ is a constant u component value of the back-facing plane for the u dimension, $b_{min,v}$ is a constant v component value of the front-facing plane for the v dimension, $b_{max,v}$ is a constant v component value of the back-facing plane for the v dimension, $b_{min,w}$ is a constant w component value of the front-facing plane for the w dimension, and $b_{max,w}$ is a constant w component value of the back-facing plane for the w dimension, wherein said determining scaled intersection distances to the planes defining the box using the scaled inverse ray components may comprise:

determining a scaled intersection distance $\tau_{u,min}$ to the front-facing plane for the u dimension by multiplying $b_{min,u}$ and $\rho_u$;

determining a scaled intersection distance $\tau_{u,max}$ to the back-facing plane for the u dimension by multiplying $b_{max,u}$ and $\rho_u$;

determining a scaled intersection distance $\tau_{v,min}$ to the front-facing plane for the v dimension by multiplying $b_{min,v}$ and $\rho_v$;

determining a scaled intersection distance $\tau_{v,max}$ to the back-facing plane for the v dimension by multiplying $b_{max,v}$ and $\rho_v$;

determining a scaled intersection distance $\tau_{w,min}$ to the front-facing plane for the w dimension, such that $\tau_{w,min} = b_{min,w} \rho_w$;

determining a scaled intersection distance $\tau_{w,max}$ to the back-facing plane for the w dimension, such that $\tau_{w,max} = b_{max,w} \rho_w$.

The method may further comprise: if the magnitude of any of the $b_{min,u}$, $b_{max,u}$, $b_{min,v}$, $b_{max,v}$, $b_{min,w}$ or $b_{max,w}$ values is zero then setting the magnitude of that value to be equal to a non-zero substitute value which is small enough that it would behave like zero in an operation in which two of said scaled intersection distances are determined and compared; and if the magnitude of the $\rho_u$ value or the $\rho_v$ value is infinity then setting the magnitude of that value to be equal to a finite substitute value which is large enough that it would behave like infinity in an operation in which two of said scaled intersection distances are determined and compared.

The method may further comprise subtracting respective components of an origin of the ray from respective components defining the positions of the front-facing planes and the back-facing planes of the box to thereby determine the values of $b_{min,u}$, $b_{max,u}$, $b_{min,v}$, $b_{max,v}$, $b_{min,w}$ and $b_{max,w}$.

The ray direction vector may be defined with components $D_x$, $D_y$ and $D_z$ in a space-coordinate system, and the method may further comprise selectively permuting the x, y and z components of the ray and the components of the box to determine how the x, y and z components of the space-coordinate system map onto the u, v and w dimensions, to thereby ensure that $D_w$ is the major component of the ray direction vector such that $|D_w| \geq |D_u|$ and $|D_w| \geq |D_v|$.

The components of the ray direction vector may all be non-negative, i.e. $D_u \geq 0$, $D_v \geq 0$ and $D_w \geq 0$. For example, the method may further comprise selectively reversing the axes for the components of the ray and the axis-aligned box, such that $D_u \geq 0$, $D_v \geq 0$ and $D_w \geq 0$.

The method may further comprise: if $t_{min,scaled} \geq 0$ and $t_{max,scaled} \geq 0$, determining whether $b_{max,u} \geq 0$, $b_{max,v} \geq 0$ and $b_{max,w} \geq 0$, wherein said determining scaled intersection distances to the planes defining the box may be performed in response to determining that $b_{max,u} \geq 0$, $b_{max,v} \geq 0$ and $b_{max,w} \geq 0$, wherein if any of $b_{max,u}$, $b_{max,v}$ and $b_{max,w}$ are less than zero then it may be determined that the ray misses the box without determining scaled intersection distances to the planes defining the box.

The method may further comprise: if $t_{min,scaled} \leq 0$ and $t_{max,scaled} \leq 0$, determining whether $b_{min,u} \leq 0$, $b_{min,v} \leq 0$ and $b_{min,w} \leq 0$, wherein said determining scaled intersection distances to the planes defining the box may be performed in response to determining that $b_{min,u} \leq 0$, $b_{min,v} \leq 0$ and $b_{min,w} \leq 0$, wherein if any of $b_{min,u}$, $b_{min,v}$ and $b_{min,w}$ are greater than zero then it may be determined that the ray misses the box without determining scaled intersection distances to the planes defining the box;

The method may further comprise: if $t_{min,scaled} \leq 0$ and $t_{max,scaled} \geq 0$, determining whether either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$, wherein said determining scaled intersection distances to the planes defining the box may be performed in response to determining that either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$, wherein if both: (i) any of $b_{min,u}$, $b_{min,v}$ and $b_{min,w}$ are greater than zero, and (ii) any of $b_{max,u}$, $b_{max,v}$ and $b_{max,w}$ are less than zero, then it may be determined that the ray misses the box without determining scaled intersection distances to the planes defining the box; and/or The method may further comprise: if $t_{min,scaled} \geq 0$ and $t_{max,scaled} \leq 0$, determining that the ray misses the box without determining scaled intersection distances to the planes defining the box.

The determined scaled inverse ray components, the determined scaled minimum culling distance and the determined scaled maximum culling distance for the ray may be used to determine whether the ray intersects a plurality of axis-aligned boxes in the ray tracing system.

The method may be performed without computing unscaled intersection distances to any of the planes of the box.

The method may further comprise outputting an indication of a result of the determination of whether the ray intersects the axis-aligned box, wherein the outputted indication may be used in the ray tracing system for rendering an image of a 3D scene.

The axis-aligned box may be an axis-aligned bounding box which bounds geometry to be rendered, and wherein the axis-aligned box may correspond to a node of a hierarchical acceleration structure to be used for performing intersection testing in the ray tracing system.

The node may be part of a bottom-level acceleration structure (BLAS) for representing geometry in an instance space, and the method may comprise transforming the ray into the instance space.

The ray tracing system may be configured to perform a polygon intersection testing process for a ray in respect of geometry bounded by a leaf node of the hierarchical acceleration structure which the ray is determined to intersect, wherein the polygon intersection testing process may determine whether the ray intersects one or more polygons defining the geometry.

The method may further comprise expanding an effective size of the box to ensure that the method is conservative with respect to rounding errors that can be introduced during intersection testing of the ray with the box.

The method may further comprise expanding an effective size of the box to ensure that the method is conservative with respect to rounding errors that can be introduced during intersection testing of the ray with the box and with respect to rounding errors that can be introduced in the polygon intersection testing process.

The scaled minimum culling distance, $t_{min,scaled}$, may be determined as $t_{min,scaled} = AD_w t_{min,unscaled} + B$, wherein B is a scalar value and wherein $B \leq 0$. For example, $B < 0$. The scaled maximum culling distance, $t_{max,scaled}$, may be determined as $t_{max,scaled} = AD_w t_{max,unscaled} + C$, wherein C is a scalar value and wherein $C \geq 0$. For example, $C > 0$.

There is provided an intersection testing module, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:

determine scaled inverse ray components $\rho_u$ and $\rho_v$, wherein $$\rho_u = \left|\frac{AD_w}{D_u}\right| \text{ and}$$

$$\rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector such that $|D_w| \geq |D_u|$ and $|D_w| \geq |D_v|$, and wherein A is a scalar value;

determine a scaled minimum culling distance, $t_{min,scaled}$, using a result of multiplying an unscaled minimum culling distance for the ray, $t_{min,unscaled}$, by the magnitude of $AD_w$;

determine a scaled maximum culling distance, $t_{max,scaled}$, using a result of multiplying an unscaled maximum culling distance for the ray, $t_{max,unscaled}$, by the magnitude of $AD_w$;

determine scaled intersection distances to the planes defining the box using the scaled inverse ray components;

identify the largest of the determined scaled intersection distances to a front-facing plane of the box;

identify the smallest of the determined scaled intersection distances to a back-facing plane of the box;

determine whether:
(i) the identified largest scaled intersection distance to a front-facing plane of the box is no greater than the identified smallest scaled intersection distance to a back-facing plane of the box;
(ii) the identified largest scaled intersection distance to a front-facing plane of the box is no greater than the scaled maximum culling distance, $t_{max,scaled}$; and
(iii) the identified smallest scaled intersection distance to a back-facing plane of the box is no less than the scaled minimum culling distance, $t_{min,scaled}$; and determine that the ray intersects the box if all of the three determinations (i) to (iii) are satisfied, and determine that the ray misses the box if one or more of the three determinations (i) to (iii) are not satisfied.

There may be provided a method of manufacturing, using an integrated circuit manufacturing system, an intersection testing module as described herein, the method comprising:

processing, using a layout processing system, a computer readable description of the intersection testing module so as to generate a circuit layout description of an integrated circuit embodying the intersection testing module; and manufacturing, using an integrated circuit generation system, the intersection testing module according to the circuit layout description.

There may be provided computer readable code configured to cause any of the methods described herein to be performed when the code is run.

There may be provided a method of determining, in a ray tracing system, whether a ray intersects a three-dimensional axis-aligned box, wherein the box represents a volume defined by a front-facing plane and a back-facing plane for each of the dimensions, u, v and w, of the three-dimensional axis-aligned box, wherein $b_{min,u}$ is a constant u component value of the front-facing plane for the u dimension, $b_{max,u}$ is a constant u component value of the back-facing plane for the u dimension, $b_{min,v}$ is a constant v component value of the front-facing plane for the v dimension, $b_{max,v}$ is a constant v component value of the back-facing plane for the v dimension, $b_{min,w}$ is a constant w component value of the front-facing plane for the w dimension, and $b_{max,w}$ is a constant w component value of the back-facing plane for the w dimension, the method comprising:

determining scaled ray components $\rho_u$ and $\rho_v$, wherein $$\rho_u = \left|\frac{D_u}{D_w}\right| \text{ and}$$

$$\rho_v = \left|\frac{D_v}{D_w}\right|,$$

and wherein a third scaled ray component $$\rho_w = \left|\frac{D_w}{D_w}\right| = 1,$$

wherein $D_u$, $D_v$ and $D_w$ are components of a ray direction vector, D, for the ray, wherein $D_w$ is the major component of the ray direction vector;

determining a scaled minimum culling distance, $t_{min,scaled}$, using a result of multiplying an unscaled minimum culling distance for the ray, $t_{min,unscaled}$, by the magnitude of $D_w$;

determining a scaled maximum culling distance, $t_{max,scaled}$, using a result of multiplying an unscaled maximum culling distance for the ray, $t_{max,unscaled}$, by the magnitude of $D_w$;

determining cross-multiplication values of $A\rho_u b_{min,v}$, $A\rho_v b_{min,u}$, $A\rho_u b_{max,v}$ and $A\rho_v b_{max,u}$ wherein A is a scalar value;

determining a cross-multiplication value of one or both of: (i) $A\rho_u b_{min,w}$ and (ii) $A\rho_v b_{min,w}$;

determining a cross-multiplication value of one or both of: (i) $A\rho_u b_{max,w}$ and (ii) $A\rho_v b_{max,w}$;

using the determined cross-multiplication values to:
identify which of the front-facing planes intersects the ray furthest along the ray; and
identify which of the back-facing planes intersects the ray least far along the ray;

determining whether the ray intersects the identified front-facing plane of the box at a position that is no further along the ray than the position at which the ray intersects the identified back-facing plane;

determining whether $\rho_{-}t_{max,scaled}$ is no less than $b_{-}$, wherein $\rho_{-}=\rho_u$ and $b_{-}=b_{min,u}$ if the front-facing plane for the u dimension is the identified front-facing plane, wherein $\rho_{-}=\rho_v$ and $b_{-}=b_{min,v}$ if the front-facing plane for the v dimension is the identified front-facing plane, and wherein $\rho_{-}=\rho_w=1$ and $b_{-}=b_{min,w}$ if the front-facing plane for the w dimension is the identified front-facing plane;

determining whether $\rho_{+}t_{min,scaled}$ is no greater than $b_{+}$, wherein $\rho_{+}=\rho_u$ and $b_{+}=b_{max,u}$ if the back-facing plane for the u dimension is the identified back-facing plane, wherein $\rho_{+}=\rho_v$ and $b_{+}=b_{max,v}$ if the back-facing plane for the v dimension is the identified back-facing plane, and wherein $\rho_{+}=\rho_w=1$ and $b_{+}=b_{max,w}$ if the back-facing plane for the w dimension is the identified back-facing plane; and determining that the ray intersects the box if all three of: (i) it is determined that the ray intersects the identified front-facing plane of the box at a position that is no further along the ray than the position at which the ray intersects the identified back-facing plane, (ii) it is determined that $\rho_{-}t_{max,scaled}$ is no less than $b_{-}$, and (iii) it is determined that $\rho_{+}t_{min,scaled}$ is no greater than $b_{+}$, otherwise determining that the ray misses the box.

There may be provided an intersection testing module, for use in a ray tracing system, configured to determine whether a ray intersects a three-dimensional axis-aligned box, wherein the box represents a volume defined by a front-facing plane and a back-facing plane for each of the dimensions, u, v and w, of the three-dimensional axis-aligned box, wherein $b_{min,u}$ is a constant u component value of the front-facing plane for the u dimension, $b_{max,u}$ is a constant u component value of the back-facing plane for the u dimension, $b_{min,v}$ is a constant v component value of the front-facing plane for the v dimension, $b_{max,v}$ is a constant v component value of the back-facing plane for the v dimension, $b_{min,w}$ is a constant w component value of the front-facing plane for the w dimension, and $b_{max,w}$ is a constant w component value of the back-facing plane for the w dimension, the intersection testing module being configured to:

determine scaled ray components $\rho_u$ and $\rho_v$, wherein $$\rho_u = \left|\frac{D_u}{D_w}\right| \text{ and}$$

$$\rho_v = \left|\frac{D_v}{D_w}\right|,$$

and wherein a third scaled inverse ray component $$\rho_w = \left|\frac{D_w}{D_w}\right| = 1,$$

wherein $D_u$, $D_v$ and $D_w$ are components of a ray direction vector, D, for the ray, wherein $D_w$ is the major component of the ray direction vector;

determine a scaled minimum culling distance, $t_{min,scaled}$, using a result of multiplying an unscaled minimum culling distance for the ray, $t_{min,unscaled}$, by the magnitude of $D_w$;

determine a scaled maximum culling distance, $t_{max,scaled}$, using a result of multiplying an unscaled maximum culling distance for the ray, $t_{max,unscaled}$, by the magnitude of $D_w$;

determine cross-multiplication values of $A\rho_u b_{min,v}$, $A\rho_v b_{min,u}$, $A\rho_u b_{max,v}$ and $A\rho_u b_{max,u}$, wherein A is a scalar value;

determine a cross-multiplication value of one or both of: (i) $A\rho_u b_{min,w}$ and (ii) $A\rho_v b_{min,w}$;

determine a cross-multiplication value of one or both of: (i) $A\rho_u b_{max,w}$ and (ii) $A\rho_v b_{max,w}$;

use the determined cross-multiplication values to:
identify which of the front-facing planes intersects the ray furthest along the ray; and
identify which of the back-facing planes intersects the ray least far along the ray;

determine whether the ray intersects the identified front-facing plane of the box at a position that is no further along the ray than the position at which the ray intersects the identified back-facing plane;

determine whether $\rho_- t_{max,scaled}$ is no less than $b_-$, wherein $\rho_-=\rho_u$ and $b_-=b_{min,u}$ if the front-facing plane for the u dimension is the identified front-facing plane, wherein $\rho_-=\rho_v$ and $b_-=b_{min,v}$ if the front-facing plane for the v dimension is the identified front-facing plane, and wherein $\rho_-=\rho_w=1$ and $b_-=b_{min,w}$ if the front-facing plane for the w dimension is the identified front-facing plane;

determine whether $\rho_+ t_{min,scaled}$ is no greater than $b_+$, wherein $\rho_+=\rho_u$ and $\alpha_+=b_{max,u}$ if the back-facing plane for the u dimension is the identified back-facing plane, wherein $\rho_+=\rho_v$ and $b_+=b_{max,v}$ if the back-facing plane for the v dimension is the identified back-facing plane, and wherein $\rho_+=\rho_w=1$ and $b_+=b_{max,w}$ if the back-facing plane for the w dimension is the identified back-facing plane; and determine that the ray intersects the box if all three of: (i) it is determined that the ray intersects the identified front-facing plane of the box at a position that is no further along the ray than the position at which the ray intersects the identified back-facing plane, (ii) it is determined that $\rho_- t_{max,scaled}$ is no less than $b_-$, and (iii) it is determined that $\rho_+ t_{min,scaled}$ is no greater than $b_+$, otherwise determine that the ray misses the box.

There may be provided a method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:

determining scaled inverse ray components $\rho_u$ and $\rho_v$, wherein $$\rho_u = \left|\frac{AD_w}{D_u}\right| \text{ and}$$

$$\rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector, and wherein A is a scalar value;

determining a scaled minimum culling distance, $t_{min,scaled}$ using a result of multiplying an unscaled minimum culling distance for the ray, $t_{min,unscaled}$, by the magnitude of $AD_w$;

determining a scaled maximum culling distance, $t_{max,scaled}$, using a result of multiplying an unscaled maximum culling distance for the ray, $t_{max,unscaled}$, by the magnitude of $AD_w$;

determining scaled intersection distances to the planes defining the box using the scaled inverse ray components; and using the determined scaled intersection distances to the planes defining the box, the scaled minimum culling distance and the scaled maximum culling distance to determine whether the ray intersects the box.

There is provided an intersection testing module configured to perform any of the methods described herein.

The intersection testing module may be embodied in hardware on an integrated circuit. There may be provided a method of manufacturing, at an integrated circuit manufacturing system, an intersection testing module. There may be provided an integrated circuit definition dataset that, when processed in an integrated circuit manufacturing system, configures the system to manufacture an intersection testing module. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying an intersection testing module.

There may be provided an integrated circuit manufacturing system comprising: a non-transitory computer readable storage medium having stored thereon a computer readable description of the intersection testing module; a layout processing system configured to process the computer readable description so as to generate a circuit layout description of an integrated circuit embodying the intersection testing module; and an integrated circuit generation system configured to manufacture the intersection testing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
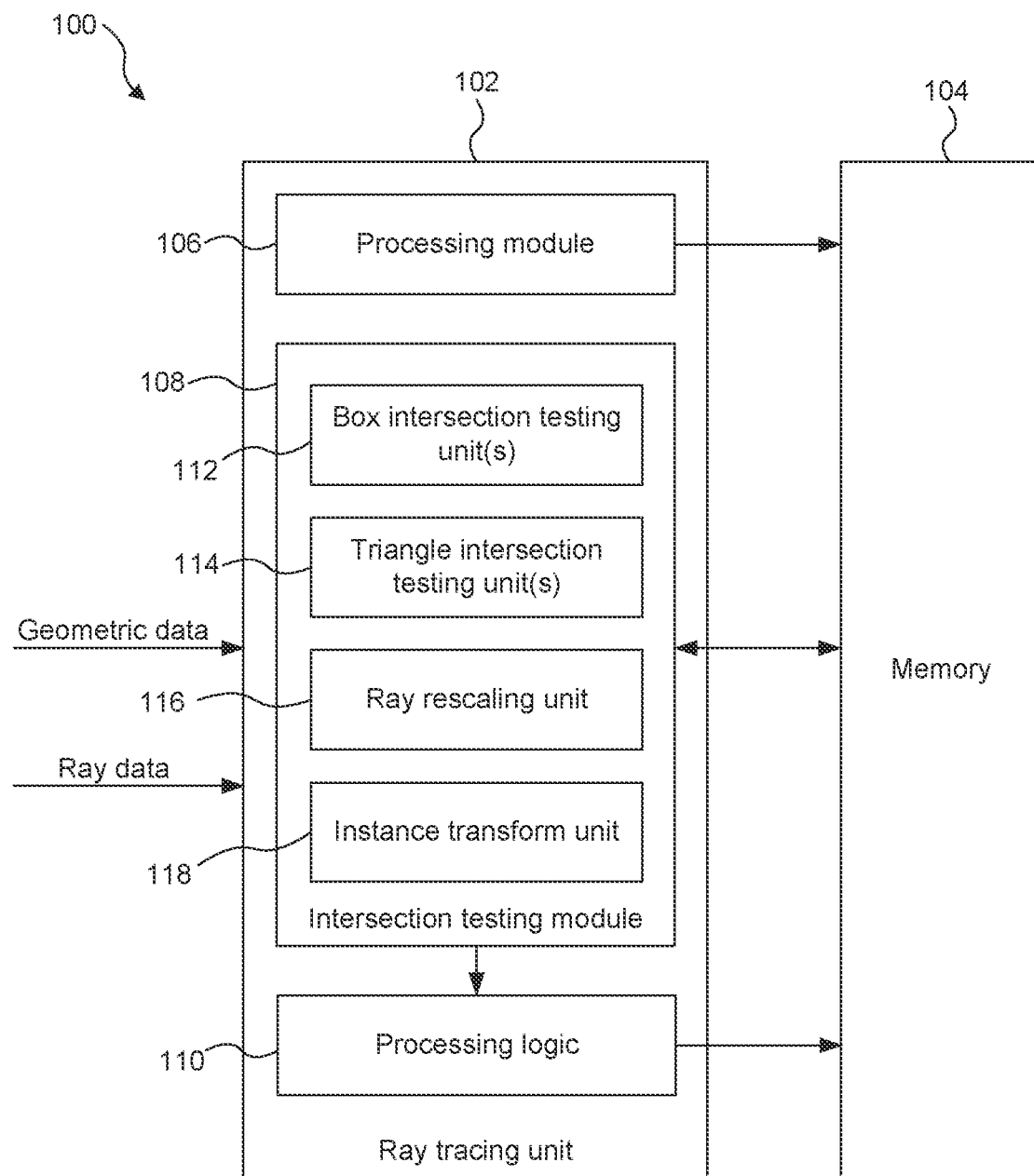
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Even when an acceleration structure is used, the amount of work involved in performing intersection testing in a ray tracing system is still very large. For example, ray tracing may be used for rendering an image of a 3D scene, where the image may have of the order of a million pixels. The pixel colour values are derived from some distribution of samples, associated with points in the image plane (typically, there is a one-to-one correspondence between pixel and sample location, but regions of an image may have a higher or lower sample density or may otherwise be independent of the arrangement of pixels). In the context of ray tracing, the samples are themselves associated with a distribution (in the statistical sense) of primary rays parameterised by the neighbourhood of each sample location. In the simplest example, a single primary ray is traced for each sample and used to determine its result. In other examples, multiple rays may be generated in accordance with the distribution (e.g. stochastic sampling) and the result derived from some accumulation or combination of the individual primary rays. When a ray intersects with an object in the scene, a shader can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives. Furthermore, the images being rendered may represent frames of a sequence of frames which are to be rendered in real-time, e.g. for display to a user in real-time. For example, the user may be playing a game wherein the rendered images represent a users view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time would be to have one or more supercomputers to perform all of the processing. This could be considered to be a 'brute force' approach. However, as well as an aim to have high performance (to perform ray tracing to render scenes to be output in real-time), there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. Depending on how this trade-off is implemented, examples described herein may allow the performance to be increased without a significant increase to the power consumption and area (compared to the prior art described above in the background section). Alternatively, in a different implementation of the trade-off, examples described herein may allow the power consumption and/or size of the ray tracing system to be decreased without significantly decreasing the performance of the ray tracing system (compared to the prior art described above in the background section). Different implementations can be designed to target different points in the trade-off between performance, power consumption and silicon area.

As described above, testing rays for intersection with Axis Aligned Bounding Boxes (AABBs), which correspond with nodes of an acceleration structure, is an extremely frequent operation in a ray tracing system. In particular, the intersection testing of rays with bounding volumes (i.e. determining whether a ray intersects an axis-aligned box) usually accounts for most of the intersection tests that are performed to render an image of a scene using ray tracing. Therefore, any optimizations that can be made to the way in which the intersection tests are performed can be very useful for optimizing the ray tracing system in terms of reducing the latency, power consumption and physical size of the ray tracing system.

In the two examples given in the background section, six tests (plus minimum and maximum distance tests) are performed to determine whether a ray intersects an axis-aligned box. According to examples described herein, these tests can be simplified and/or intermediate values which are used in multiple tests may be calculated once and reused rather than calculating them each time they are to be used, thereby reducing the amount of processing work that is involved in performing the tests for determining whether a ray intersects an axis-aligned box. This can be achieved by performing a small amount of pre-calculation that is constant for the ray, so the cost of performing this pre-calculation can be ameliorated because it is performed once for a ray and then can be used in many intersection tests involving that ray. The ray direction vector D has components $D_x$, $D_y$ and $D_z$ (in the three dimensions of the space coordinate system in which the box is defined: x, y and z). In the examples described in detail below, before performing intersection testing, the x, y and z components of the ray and the axis-aligned box are selectively permuted (i.e. selectively swapped) and/or reversed, to determine corresponding u, v and w components, where the dimensions u, v and w correspond to the permuted and/or reversed dimensions x, y and z of the space coordinate system. In particular, in these examples, the selective reversing of the axes is performed such that the ray direction vector points into the octant of the space-coordinate system which has positive values for u, v and w, and the selective permutation of the axes is performed such that $D_w$ is the major component of the ray direction, i.e. $|D_w| \geq |D_u|$ and $|D_w| \geq |D_v|$. Therefore, after the selective permutation and/or reversing of the axes, it is known that $D_w \geq D_u \geq 0$ and $D_w \geq D_v \geq 0$. Since any valid ray direction vector has a non-zero magnitude, it is also known that $|D_w| > 0$. For example, values of $$\left|\frac{D_u}{D_w}\right| \text{ and } \left|\frac{D_v}{D_w}\right|$$

for a ray may be pre-computed and may be stored. As another example, values of $$\left|\frac{AD_w}{D_u}\right| \text{ and } \left|\frac{AD_w}{D_v}\right|$$

for a ray may be pre-computed and may be stored, wherein A is a scalar value, e.g. A is a non-zero constant value, and in some examples, A=1. In some examples, a value of $$\frac{1}{D_w}$$

for a ray may be pre-computed and may be stored as well. For box testing, we might just use the sign of $D_w$, so rather than storing $D_w$ or $$\frac{1}{D_w},$$

in some examples, just the sign of $D_w$ may be stored for use in the box testing. After these values have been pre-computed they can be used for performing intersection testing on the ray. The pre-computed values can be used for multiple intersection tests, which may be performed in parallel. In some examples, the pre-computed values are stored so that they can be read, rather than calculated for use in performing intersection testing on the ray. Reducing the amount of processing work that is involved in performing the tests for determining whether a ray intersects an axis-aligned box, can reduce the latency, size and/or power consumption of an intersection testing module in a ray tracing system.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more box intersection testing units 112, one or more triangle intersection testing units 114 a ray rescaling unit 116 and an instance transform unit 118. In some examples the intersection testing module 108 may also include one or more procedural tester units (not shown in FIG. 1) for performing intersection testing with respect to procedural primitives (e.g. those generated programmatically by shader code). In operation the ray tracing unit 102 receives geometric data defining objects within the 3D scene. The ray tracing unit 102 also receives ray data defining rays that are to be tested for intersection. The rays may be primary rays or secondary rays. The processing module 106 is configured to generate an acceleration structure based on the geometric data, and to send the acceleration structure to the memory 104 for storage therein. After the acceleration structure has been stored in the memory 104, the intersection testing module 108 can retrieve nodes (comprising data defining the axis-aligned boxes corresponding to the nodes) of the acceleration structure from the memory 104 to perform intersection testing of rays against the retrieved nodes. To avoid reading in the whole acceleration structure at a time, the intersection testing module 108 retrieves a subset of the boxes from one level of the acceleration structure from memory 104 at each stage, based on the results of previous intersection tests. The box intersection testing unit(s) 112 performs intersection tests to determine whether or not a ray intersects each of the bounding boxes corresponding to nodes of the acceleration structure (where a miss can cull vast swathes of the hierarchical acceleration structure). If a leaf node is intersected then the triangle intersection testing unit(s) 114 perform one or more triangle intersection tests to determine which object(s) (if any) the ray intersects. The results of the intersection tests indicate which object in the scene a ray intersects, and the results may also indicate a position on the object at which the ray intersects the object, and may also indicate a distance along the ray that the intersection occurs. The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

Figure 2A:
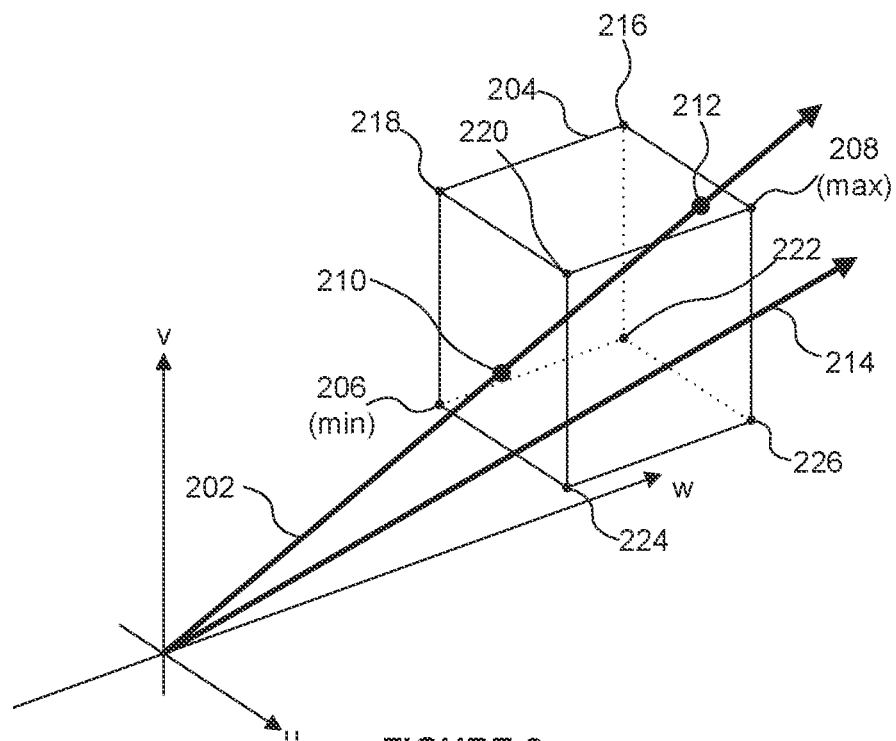
FIG. 2a shows two rays and a box from a first viewpoint.

FIG. 2a illustrates two rays 202 and 214 and a box 204 from a first viewpoint. As described above, the rays 202 and

214, r(t), can be represented as r(t)=O+Dt, where O is a vector representing the origin of the ray and D is the direction vector of the ray, where O=($O_x$,$O_y$,$O_z$) and D=($D_x$, $D_y$,$D_z$). The x, y and z axes can be selectively permuted and/or reversed to thereby determine u, v and w axes of the coordinate system. The u, v and w axes are shown in FIG. 2a. In this example, both of the rays 202 and 214 have the same origin and the origin of the coordinate system is at the origin of the rays. This can be achieved by translating the positions of the ray origins and the box by subtracting the ray origin. The box 204 is an axis-aligned box with respect to the u, v and w axes (and with respect to the x, y and z axes). The coordinate system could be a world space coordinate system of a scene being rendered, or the coordinate system could be an instance space coordinate system of an instance of a set of geometry within a scene being rendered. The corner 206 of the box 204 is at a position ($b_{min,u}$, $b_{min,v}$, $b_{min,w}$) and the opposite corner 208 of the box is at a position ($b_{max,u}$, $b_{max,v}$, $b_{max,w}$). The box 204 represents a volume defined by a front-facing plane and a back-facing plane for each dimension of the three-dimensional axis-aligned box. In particular, for the u dimension there is: (i) a front-facing (FF) plane (including corner points 206, 216, 218 and 222) which has a normal which is parallel to the u-axis and which points towards negative values of u, wherein any point on the front-facing plane for the u dimension has a u component value of $b_{min,u}$; and (ii) a back-facing (BF) plane (including corner points 208, 220, 224 and 226) which has a normal which is parallel to the u-axis and which points towards positive values of u, wherein any point on the back-facing plane for the u dimension has a u component value of $b_{max,u}$. For the v dimension there is: (i) a front-facing (FF) plane (including corner points 206, 222, 224 and 226) which has a normal which is parallel to the v-axis and which points towards negative values of v, wherein any point on the front-facing plane for the v dimension has a v component value of $b_{min,v}$; and (ii) a back-facing (BF) plane (including corner points 208, 216, 218 and 220) which has a normal which is parallel to the v-axis and which points towards positive values of v, wherein any point on the back-facing plane for the v dimension has a v component value of $b_{max,v}$. For the w dimension there is: (i) a front-facing (FF) plane (including corner points 206, 218, 220 and 224) which has a normal which is parallel to the w-axis and which points towards negative values of w, wherein any point on the front-facing plane for the w dimension has a w component value of $b_{min,w}$; and (ii) a back-facing (BF) plane (including corner points 208, 216, 222 and 226) which has a normal which is parallel to the w-axis and which points towards positive values of w, wherein any point on the back-facing plane for the w dimension has a w component value of $b_{max,w}$. In the example shown in FIG. 2a, the rays 202 and 214 and the box 204 are all in the positive octant of the coordinate system, i.e. the direction vectors of rays 202 and 214 have positive values for all of their component values, and all of $b_{min,u}$, $b_{max,u}$, $b_{max,v}$ and $b_{max,w}$ are positive. Unlike a general object which may have no correlation between planes/faces defining the object, the planes defining the faces of an axis-aligned bounding box (AABB) are arranged in parallel pairs, such that for each dimension the AABB has a front-facing plane and a parallel back-facing plane. As described above, the axes are selectively reversed such that the ray direction vector points into the octant of the space-coordinate system which has positive values for u, v and w, i.e. $D_u \geq 0$, $D_v \geq 0$ and $D_w > 0$. Therefore, the front-facing plane for an axis has a lower constant component value along that axis than the back-facing plane for the axis. For a pair of parallel planes of the AABB, the front-facing (FF) plane is the one that the ray will intersect first (when looking along the direction of the ray from −∞) and the back-facing (BF) plane is the one that the ray will intersect second (when looking along the direction of the ray from −∞). If a ray intersects with the box 204 (for which all of $b_{min,u}$, $b_{max,u}$, $b_{max,v}$ and $b_{max,w}$ are positive) then it will enter the box through a front-facing plane and it will exit the box through a back-facing plane. This generalises so that if a box is placed behind a ray origin (such that intersection may occur for negative t), the front-facing plane is intersected by the ray at the lower (most negative) value of t and the back-facing plane is intersected by the ray at the higher (least negative) value of t. It is also noted that if the ray points parallel to any pair of planes (i.e. if at least one of $D_u$ and $D_v$ is zero), then it will intersect, at most, one of the planes of the pair of planes, whereas if a ray is not parallel to a pair of planes then there are unique entry and exit points of the (infinite) volume bounded by the front- and back-facing planes of the pair of planes respectively.

Figure 2B:
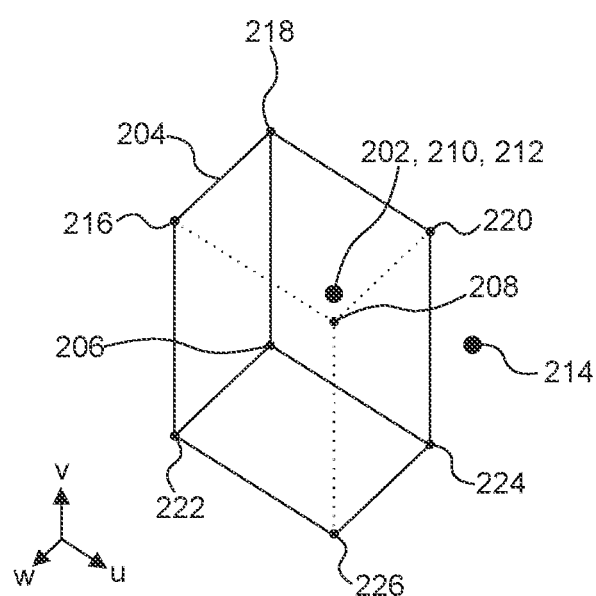
FIG. 2b shows the rays and the box from a second viewpoint, wherein the second viewpoint is at the origin of the rays.

FIG. 2b shows the rays 202 and 214 and the box 204 from a second viewpoint, wherein the second viewpoint is at the origin of the rays. Since the viewpoint of FIG. 2b is the origin of the rays 202 and 214, the rays just appear as points. The u, v and w axes are shown in FIG. 2b. The corners of the box 204 are labelled as 206, 208, 216, 218, 220, 222, 224 and 226 consistently in both FIGS. 2a and 2b to aid the understanding of how the box 204 is viewed in the two figures.

As shown in FIGS. 2a and 2b, the ray 202 intersects the box 204. In particular, the ray 202 intersects planes of the box at positions 210 and 212. In FIG. 2b, the intersection points 210 and 212 are at the same projected position as the ray 202. The ray 202 enters the box 204 at position 210 which is on the front-facing plane of the box 204 for the w dimension, which has a constant w component value of $b_{min,w}$. The ray 202 exits the box 204 at position 212 which is on the back-facing plane of the box 204 for the v dimension, which has a constant v component value of $b_{max,v}$. The ray 214 does not intersect the box 204.

Figure 3A:
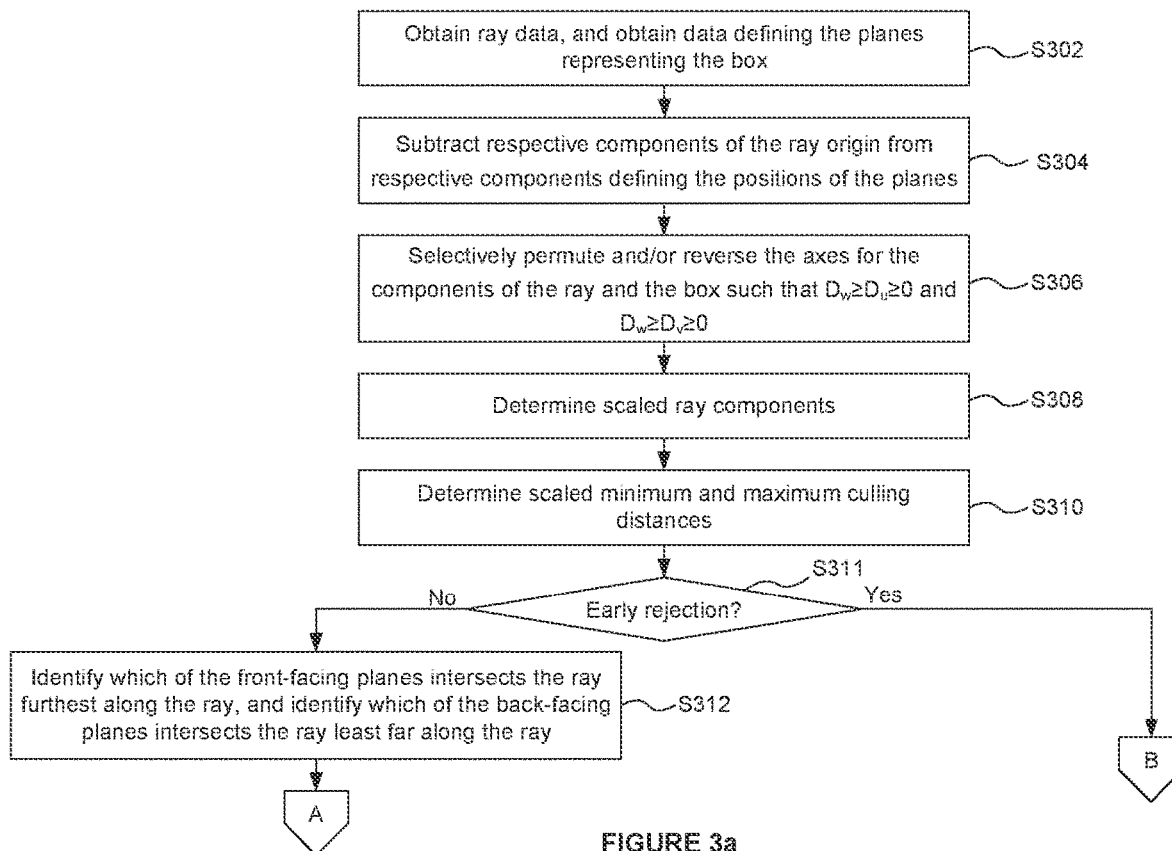
FIGS. 3a and 3b show a flow chart for a method of performing intersection testing to determine whether a ray intersects a 3D axis-aligned box according to examples described herein.
Figure 3B:
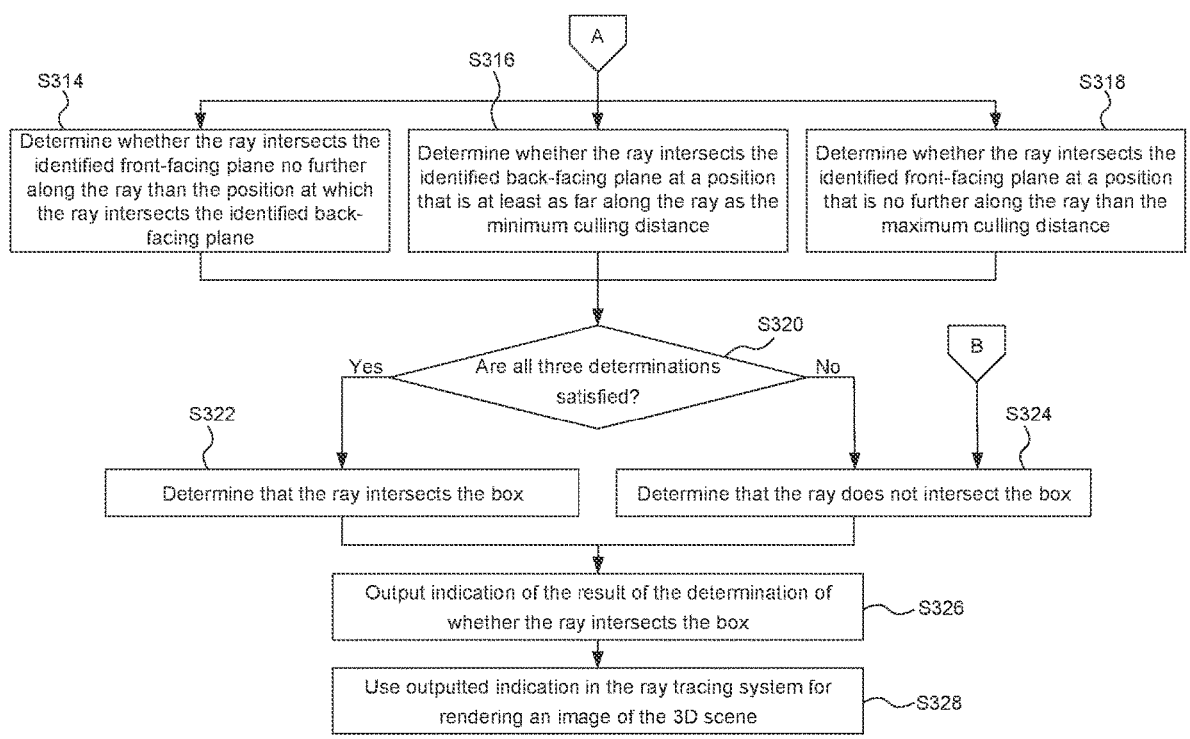

FIGS. 3a and 3b show a flow chart for a method of performing intersection testing to determine whether the ray 202 intersects the 3D axis-aligned box 204. Although the description below refers to testing whether the ray 202 intersects the box 204, the same method can be applied for testing whether the ray 214 intersects the box 204. The method shown in FIGS. 3a and 3b is performed by the intersection testing module 108.

In step S302 data defining the ray 202 and the box 204 are obtained at the intersection testing module 108. In particular, data defining the components of the ray origin and the ray direction are obtained. The data defining the ray origin may be the three components of the ray origin position, $O_x$, $O_y$, and $O_z$. The data defining the ray direction may comprise three components of the ray direction, $D_x$, $D_y$, and $D_z$. The data defining the box may be data defining the positions of the planes representing the box, e.g. the component values which are constant for each of the front-facing plane and the back-facing plane in each of the three dimensions.

In step S304, the intersection testing module 108 (e.g. the box intersection testing unit(s) 112 or the instance transform unit 118) subtracts respective components of the origin of the ray from respective components defining the positions of the front-facing planes and the back-facing planes of the box. Step S304 can be described as performing a translation on the ray 202 and the box 204 so that the origin of the coordinate system is at the origin of the ray 202. From this point on in the method described with reference to FIGS. 3a and 3b, the origin of the ray is at the origin of the coordinate system, i.e. at a position (0,0,0).

In step S306 the axes for the components of the ray and the box are selectively permuted and/or reversed by the intersection testing module 108 (e.g. by the instance transform unit 118), such that $D_w \geq D_u \geq 0$ and $D_w \geq D_v \geq 0$. The selective permutation and/or reversal of the axes in step S306 maps the x, y and z axes of the space coordinate system onto the u, v and w axes. The permutation of the axes may be thought of as rearranging the axes. In particular, a permutation of the axes comprises: (i) a rotation of three axes, (ii) a transposition of two axes, or (iii) the identity (i.e. not changing the axes). It is noted that a permutation involving a transposition of two axes may alter the handedness of the coordinate system, whereas a permutation that does not involve a transposition of two axes will not alter the handedness of the coordinate system. The permutation of the axes is performed so that the major component of the ray direction is $D_w$ (i.e. ensuring that $|D_w| \geq |D_u|$ and $|D_w| \geq |D_v|$). For example, if the z component of the ray direction vector has a larger magnitude than the x and y components of the ray direction vector then no permutation is used (which may be thought of as the permutation using the identity operation), such that u=x, v=y and w=z; if the x component of the ray direction vector has a larger magnitude than the y and z components of the ray direction vector then the permutation comprises a rotation of the three axes such that u=y, v=z and w=x; and if they component of the ray direction vector has a larger magnitude than the x and z components of the ray direction vector then the permutation comprises a transposition of they and z axes such that u=x, v=z and w=y. It would be possible to just perform the selective permutation in step S306 (i.e. not perform the selective reversing), but in the method described with reference to FIG. 3, the selective reversing of zero, one or more of the axes is performed so that the ray direction is into the octant with positive u, v and w. The "reversing" of the axes, may be referred to as "reflecting", "inverting" or "negating", and may involve changing the sign of all of the component values in the dimension along the axis in question. The data defining the ray comprises the ray direction, and the data defining the box comprises the component values defining the positions of the planes of the box. Irrespective of whether the selective reversal of the axes is performed, care needs to be taken to correctly identify which planes are "front-facing" planes and which planes are "back-facing" planes because, as would be apparent to a person skilled in the art, reversing the axes for a dimension exchanges which of the planes for that dimension is front-facing and which is back-facing. In particular, the front-facing plane for a negative ray component has the higher value (e.g. least negative) and the back-facing plane has the lower value (e.g. most negative). In some examples, it is convenient to explicitly identify which of a pair of planes is front-facing and which is back-facing for a ray with positive ray direction along the particular dimension as part of the AABB format (e.g. an ordered sequence of components are encoded such that the first triplet of values is less than or equal to the second); by definition this does not depend on the direction of any given ray. In these examples, it is unnecessary to compare pairs of planes to establish which is front-facing and which is back-facing relative to a particular ray. If the corresponding ray direction component is positive, the front- and back-facing planes are assumed to be as specified by the AABB format, otherwise the ray direction component is negative and the planes are exchanged. For convenience of exposition, we assume that the selective reversal of the axes is performed, i.e. such that the ray direction is into the octant with positive u, v and w, so that if a ray direction component for a particular dimension is negative, its axis is reversed and then the definition of the front-facing and back-facing planes for the particular dimension is switched to that described herein, such that the front-facing plane would be the plane that has a lower constant component value along the particular dimension compared to the constant component value along the particular dimension for the back-facing plane.

FIGS. 2a and 2b show the ray 202 and the box 204 after the translation and the selective permutation and/or reversal of the axes have been performed in steps S304 and S306, such that the origin of the coordinate system is at the origin of the ray, and such that $D_w \geq D_u \geq 0$ and $D_w \geq D_v \geq 0$.

In step S308 the intersection testing module 108 (e.g. the ray rescaling unit 116) determines scaled ray components for the direction vector of the ray 202. This rescaling can be performed differently in different embodiments, as described in more detail below with reference to FIGS. 5 and 6. For example, the rescaled ray components (i.e. the components of the ray direction vector), $\rho_u$, $\rho_v$ and $\rho_w$ can be determined as $$\rho_u = \left|\frac{D_u}{D_w}\right|,$$

$$\rho_v = \left|\frac{D_v}{D_w}\right| \text{ and}$$

$$\rho_w = \left|\frac{D_w}{D_w}\right| = 1.$$

In this example, no operations or calculations are performed to determine the value of $\rho_w$, because it is just known that, by definition, $\rho_w = 1$, so step S308 might just involve operations or calculations to determine $\rho_u$ and $\rho_v$. It is noted that in the main examples described herein the axes are selectively reversed so that $D_u \geq 0$, $D_v \geq 0$ and $D_w \geq 0$, so in these examples the modulus signs have no effect in the expressions for $\rho_u$, $\rho_v$, and $\rho_w$, such that $$\rho_u = \frac{D_u}{D_w},$$

$$\rho_v = \frac{D_v}{D_w} \text{ and}$$

$$\rho_w = \frac{D_w}{D_w} = 1.$$

As another example, the rescaled ray components (i.e. the components of the ray direction vector), $\rho_u$, $\rho_v$ and $\rho_w$ can be determined as $$\rho_u = \left|\frac{AD_w}{D_u}\right|,$$

$$\rho_v = \left|\frac{AD_w}{D_v}\right| \text{ and}$$

$$\rho_w = \left|\frac{AD_w}{D_w}\right| = |A|,$$

where A is a finite, non-zero scalar constant, e.g. A=1. In this example, no operations or calculations are performed to determine the value of $\rho_w$, because it is just known that, by definition, $\rho_w = |A|$, where the value of $|A|$ is constant and predetermined, so step S308 might just involve operations or calculations to determine $\rho_u$ and $\rho_v$. In examples described herein A is positive, and it is noted again that in the main examples described herein the axes are selectively reversed so that $D_u \geq 0$, $D_v \geq 0$ and $D_w \geq 0$, so in these examples the modulus signs have no effect in the expressions for $\rho_u$, $\rho_v$, and $\rho_w$, such that $$\rho_u = \frac{AD_w}{D_u},$$

$$\rho_v = \frac{AD_w}{D_v} \text{ and}$$

$$\rho_w = \frac{AD_w}{D_w} = A.$$

As described in more detail below, the rescaling of the ray components can simplify the operations that are performed by the box intersection testing unit(s) 112 in order to determine whether the ray intersects a box (and in the triangle intersection testing unit(s) 114 to determine whether the ray intersects a triangle).

In the examples described herein, the calculations that are performed in step S308 by the ray rescaling unit 116 involve a division operation. Division operations are generally more complex to implement in hardware than many other operations including multiplication, addition and subtraction operations. However, the rescaling of the ray components in step S308 can be performed once for a ray and then the rescaled ray components can subsequently be used many times in the intersection testing module, e.g. by the box intersection testing unit(s) 112 and/or the triangle intersection testing unit(s) 114. Therefore, the cost involved in performing the operations in step S308 for a ray can be amortized over many intersection tests involving the ray. Furthermore, since the rescaled ray components can simplify the operations that are performed by the box intersection testing unit(s) 112 and/or the triangle intersection testing unit(s) 114, the use of the rescaled ray components can improve the efficiency of the intersection testing module 108 overall (e.g. in terms of reduced processing latency, reduced silicon area and/or reduced power consumption). It is noted that where the rescaled ray components are used for intersection testing with multiple boxes then indications of the signs of the original ray components (e.g. sgn($D_x$), sgn($D_y$) and sgn($D_z$)) and an indication of which of the axes is the ray direction major axis are stored as well as the rescaled ray components so that the intersection testing module 108 knows how to selectively permute and/or reverse the axes (as described above in relation to step S306) to thereby map the x, y and z box components onto the u, v and w axes for testing the ray against subsequent boxes. In these examples, step S302 might involve receiving the rescaled ray components and the indications of the signs of the original ray components and the indication of which of the axes is the ray direction major axis, then steps S304 and S306 would involve selectively permuting and/or reversing the axes of the box components to match how the ray components were selectively permuted and/or reversed (in accordance with the indications of the signs of the ray components and the indication of which of the axes is the ray direction major axis) and subtracting the components of the ray origin from the box components. Therefore, in these examples, steps S304 and S306 are performed for the box components for subsequent boxes but do not need to be repeated for the ray components of the same ray.

An unscaled minimum culling distance, $t_{min,unscaled}$, and an unscaled maximum culling distance, $t_{max,unscaled}$, for the ray 202 are received at the intersection testing module 108. In step S310 the intersection testing module 108 (e.g. the ray rescaling unit 116) determines scaled minimum and maximum culling distances, $t_{min,scaled}$ and $t_{max,scaled}$, using a result of multiplying the unscaled minimum and maximum culling distances for the ray by the magnitude of $D_w$. For example, the scaled minimum culling distance may be determined as $t_{min,scaled} = D_w t_{min,unscaled}$, and the scaled maximum culling distance may be determined as $t_{max,scaled} = D_w t_{max,unscaled}$. In another example, the scaled minimum culling distance may be determined as $t_{min,scaled} = AD_w t_{min,unscaled}$, and the scaled maximum culling distance may be determined as $t_{max,scaled} = AD_w t_{max,unscaled}$, where A is the scalar value that may have been used to determine the rescaled ray components.

The scaled ray components and the scaled minimum and maximum culling distances, $t_{min,scaled}$ and $t_{max,scaled}$, that are determined by the ray rescaling unit 116 in steps S308 and S310 are stored for the ray 202 (e.g. in a memory of the ray tracing unit 102 not shown in FIG. 1, e.g. in a memory within the intersection testing module 108) for subsequent use by the box intersection testing unit(s) 112 and/or the triangle intersection testing unit(s) 114 when they perform intersection tests involving the ray.

As mentioned above, it is noted that steps S302 to S310 might not be performed in the order in which they are shown in FIG. 3a. For example, steps S306, S308 and S310 could be performed for a ray before it is known which box the ray is to be intersection tested against. Therefore, these steps could be performed and indications of the signs of the original ray components and an indication of which of the axes is the ray direction major axis can be stored, and then steps S302 and S304 could be performed, wherein the data that is received for the ray in step S302 could include the rescaled ray components (which might not include a value for $\rho_w$), the indications of the signs of $D_x$, $D_y$ and $D_z$, the indication of which of $D_x$, $D_y$ and $D_z$ is the largest (i.e. which is the major axis) and the scaled minimum and maximum culling distances for the ray that have been determined in steps S308 and S310. If the ray is involved in intersection tests in respect of multiple boxes and/or triangles, then steps S306, S308 and S310 can be performed once for the ray to determine the scaled ray components and the scaled minimum and maximum culling distances for the ray, which can then be used in multiple intersection tests to test the ray for intersection with multiple boxes and/or triangles.

The scaled ray components determined in step S308 and the scaled minimum and maximum culling distances determined in step S310 are used to determine whether the ray intersects the box.

In step S311 an early rejection test may be performed. The early rejection test is described in more detail below with reference to FIG. 7. If it is determined that the intersection between the ray and the box can be rejected at this early stage then the method passes straight from step S311 to step S324 in which it is determined that the ray misses the box, without performing steps S312 to S322. However, if step S311 does not determine that the intersection between the ray and the box can be rejected at this early stage then the method passes from step S311 to step S312. In some examples the early rejection test of step S311 is not performed, and in those examples the method would pass straight from step S310 to step S312.

In step S312 the intersection testing module 108 (specifically the one or more box intersection testing units 112) identifies which of the front-facing planes of the box 204 intersects the ray 202 furthest along the ray and identifies which of the back-facing planes of the box 204 intersects the ray 202 least far along the ray. This step is performed using the rescaled ray components $\rho_u$, $\rho_v$ and $\rho_w$ and the components defining the positions of the planes of the box 204 $b_{min,u}$, $b_{min,v}$, $b_{min,w}$, $b_{max,u}$, $b_{max,v}$ and $b_{max,w}$. The way that step S312 is performed is different in different examples, as described below with reference to FIGS. 5 and 6, and depends upon the way in which the ray components were scaled in step S308.

As described above, for each dimension the box 204 has a front-facing plane and a back-facing plane. A ray will intersect the front-facing plane for a dimension before it intersects the back-facing plane for the dimension. Because of the selective reversing of the axes in step S306, such that the ray is directed into the positive octant of the space coordinate system defined by the u, v and w axes, the front-facing plane for a dimension will have the minimum component value for that dimension (e.g. $b_{min,u}$, $b_{min,v}$ or $b_{min,w}$), and the back-facing plane for a dimension will have the maximum component value for that dimension (e.g. $b_{max,u}$, $b_{max,v}$ or $b_{max,w}$). If the ray origin lies outside the box and if the ray enters and exits the box then the ray enters the box through a front-facing plane, and the ray exits the box through a back-facing plane. In particular, if a ray enters and exits a box then the ray enters the box through the front-facing plane which (out of the three front-facing planes of the box) intersects the ray furthest along the ray, and the ray exits the box through the back-facing plane which (out of the three back-facing planes) intersects the ray least far along the ray. In the case of a tie, the ray enters (or exits) the box on multiple front-facing (or back-facing) planes, either on a corner (if all faces tie) or an edge (if two faces tie). The phrase "furthest along the ray" is to be understood here as meaning "at a point with the greatest t value" (in the ray equation r(t)=O+Dt) and the phrase "least far along the ray" is to be understood here as meaning "at a point with the lowest t value" (in the ray equation r(t)=O+Dt). Therefore, in the examples described herein, the phrases "furthest along" and "least far along" are referring to the ray direction vector, rather than meaning "furthest from the ray origin" or "least far from the ray origin".

The method passes from step S312 to steps S314, S316 and S318.

In step S314 the box intersection testing unit(s) 112 determines whether the ray would intersect the axis-aligned box if the ray were infinitely long. To do this, in step S314 the intersection testing module 108 (e.g. the box intersection testing unit(s) 112) determines whether the ray intersects the identified front-facing plane no further along the ray than the position at which the ray intersects the identified back-facing plane. If the ray does intersect the identified front-facing plane no further along the ray than the position at which the ray intersects the identified back-facing plane, then the ray may intersect the box (subject to the minimum and maximum distance culling tests in steps S316 and S318). However, if the ray intersects the identified front-facing plane further along the ray than the position at which the ray intersects the identified back-facing plane, then the ray does not intersect the box, i.e. it misses the box.

For example, with reference to FIGS. 2a and 2b, the identified front-facing plane of the box 204 for the ray 202 (identified in step S312) is the front-facing plane for the w dimension which has a constant w component value of $b_{min,w}$. This is because the ray 202 intersects the front-facing plane for the w dimension further along the ray than where the ray 202 intersects the front-facing planes for the u and v dimensions. The identified back-facing plane of the box 204 for the ray 202 (identified in step S312) is the back-facing plane for the v dimension which has a constant v component value of $b_{max,v}$. This is because the ray 202 intersects the back-facing plane for the v dimension less far along the ray than where the ray 202 intersects the back-facing planes for the u and w dimensions. Then it is determined in step S314 that the ray 202 intersects the identified front-facing plane at point 210 less far along the ray than where the ray 202 intersects the identified back-facing plane at point 212, and so the ray 202 may intersect the box 204 (subject to the minimum and maximum distance culling tests in steps S316 and S318).

As another example, with reference to FIGS. 2a and 2b, the identified front-facing plane of the box 204 for the ray 214 (identified in step S312) is the front-facing plane for the w dimension which has a constant w component value of $b_{min,w}$. This is because the ray 214 intersects the front-facing plane for the w dimension further along the ray than where the ray 214 intersects the front-facing planes for the u and v dimensions. The identified back-facing plane of the box 204 for the ray 214 (identified in step S312) is the back-facing plane for the u dimension which has a constant u component value of $b_{max,u}$. This is because the ray 214 intersects the back-facing plane for the u dimension less far along the ray than where the ray 214 intersects the back-facing planes for the v and w dimensions. Then it is determined in step S314 that the ray 214 intersects the identified front-facing plane further along the ray than where the ray 214 intersects the identified back-facing plane, and so the ray 214 is determined to miss the box 204, as can be seen in FIGS. 2a and 2b.

Figure 4A:
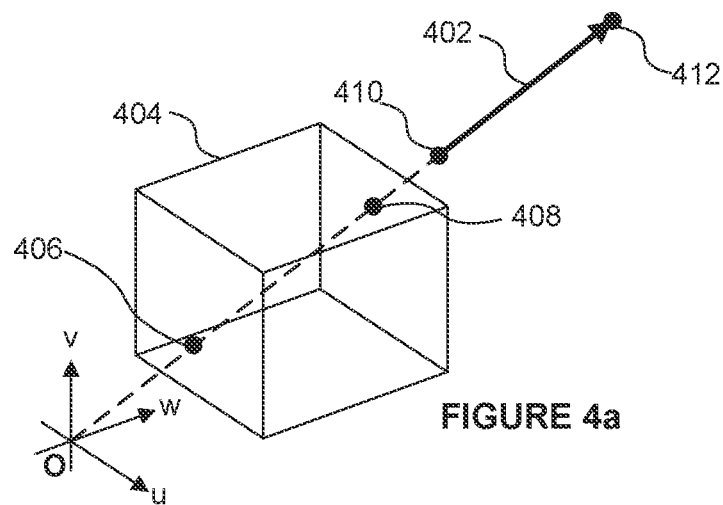
FIG. 4a shows a ray and a box where the start of the ray is beyond the box.

In step S316 the box intersection testing unit(s) 112 determines whether the ray intersects the identified back-facing plane at a position that is at least as far along the ray as the minimum culling distance for the ray. If the ray does intersect the identified back-facing plane at a position that is at least as far along the ray as the minimum culling distance, then the ray may intersect the box (subject to the tests in steps S314 and S318). However, if the ray intersects the identified back-facing plane at a position that is less far along the ray than the minimum culling distance, then the ray does not intersect the box, i.e. it misses the box. In other words, in step S316, the box intersection testing unit(s) 112 determines whether or not the start of the ray (defined by the minimum culling distance) is beyond the box when travelling along the direction vector of the ray. FIG. 4a shows an example in which the box intersection testing unit(s) 112 determines whether a ray 402 intersects a box 404. A minimum culling distance defines the minimum valid distance of the ray from the ray origin 410, and a maximum culling distance defines the maximum valid distance of the ray from the ray origin 412. In step S314 it will be determined that the ray 402 intersects the identified front-facing plane of the box 404 (at point 406) before it intersects the identified back-facing plane of the box 404 (at point 408), such that the ray 402 may intersect the box 404. In some examples the minimum culling distance is zero, but in the example shown in FIG. 4a the minimum culling distance is greater than zero. It is noted that because of the selective reversing of axes in step S306, the direction vector of the ray is into the positive octant, i.e. $D_u \geq 0$, $D_v \geq 0$, and $D_w > 0$. In the example shown in FIG. 4a the minimum valid distance of the ray from the ray origin 410 is greater than the distance from the ray origin to the intersection of the ray with the closest back-facing plane of the box, at point 408. Therefore, in this example, in step S316 it will be determined that a minimum distance condition is not satisfied, i.e. it will be determined that the ray intersects the identified back-facing plane of the box 404 at a position 408 that is less far along the ray than the minimum culling distance, such that the ray 402 does not intersect the box 404.

Figure 4B:
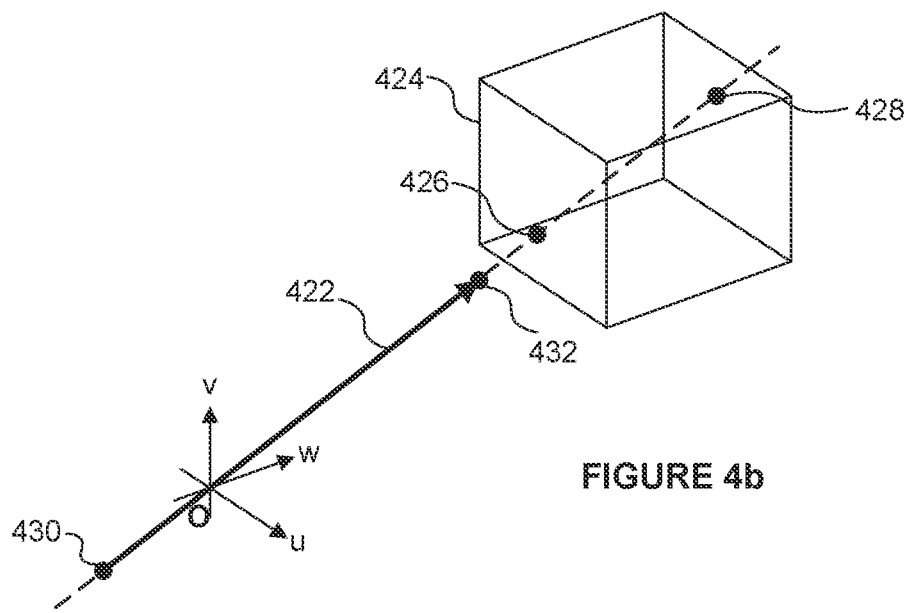
FIG. 4b shows a ray and a box where the end of the ray is before the box.

In step S318 the box intersection testing unit(s) 112 determines whether the ray intersects the identified front-facing plane at a position that is no further along the ray than the maximum culling distance for the ray. If the ray intersects the identified front-facing plane at a position that is no further along the ray than the maximum culling distance, then the ray may intersect the box (subject to the tests in steps S314 and S316). However, if the ray intersects the identified front-facing plane at a position that is further along the ray than the maximum culling distance, then the ray does not intersect the box. In other words, in step S318, the box intersection testing unit(s) 112 determines whether or not the end of the ray (defined by the maximum culling distance) is before the box when travelling along the direction vector of the ray. FIG. 4b shows an example in which the box intersection testing unit(s) 112 determines whether a ray 422 intersects a box 424. A minimum culling distance defines the minimum valid distance of the ray from the ray origin 430, and a maximum culling distance defines the maximum valid distance of the ray from the ray origin 432. It is noted that the minimum culling distance 430 is negative in this example, i.e. with the ray being defined as r(t)=O+Dt, with $D_u \geq 0$, $D_v \geq 0$, and $D_w > 0$, the minimum culling distance 430 is at a position with a negative value of t. The same method can be applied with negative values of t as with positive values of t. In step S314 it will be determined that the ray 422 intersects the identified front-facing plane of the box 424 (at point 426) before it intersects the identified back-facing plane of the box 424 (at point 428), such that the ray 422 may intersect the box 424. In the example shown in FIG. 4b the maximum valid distance of the ray from the ray origin 432 is less than the distance from the ray origin to the intersection of the ray with the furthest front-facing plane of the box, at point 426. Therefore, in this example, in step S318 it will be determined that a maximum distance condition is not satisfied, i.e. it will be determined that the ray intersects the identified front-facing plane of the box 424 at a position 426 that is further along the ray than the maximum culling distance, such that the ray 422 does not intersect the box 424.

Figure 4C:
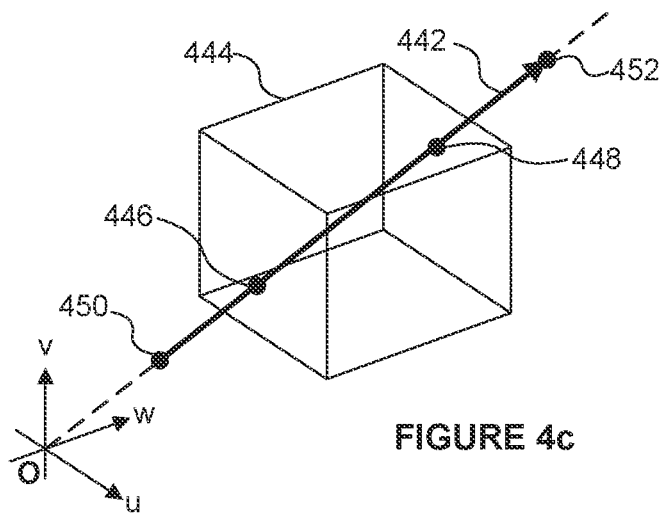
FIG. 4c shows a ray and a box where the start of the ray is before the box and the end of the ray is beyond the box.

FIG. 4c shows an example in which the box intersection testing unit(s) 112 determines whether a ray 442 intersects a box 444. A minimum culling distance defines the minimum valid distance of the ray from the ray origin 450, and a maximum culling distance defines the maximum valid distance of the ray from the ray origin 452. In step S314 it will be determined that the ray 442 intersects the identified front-facing plane of the box 444 (at point 446) before it intersects the identified back-facing plane of the box 444 (at point 448), such that the ray 442 may intersect the box 444. In the example shown in FIG. 4c the minimum valid distance of the ray from the ray origin 450 is less than the distance from the ray origin to the intersection of the ray with the closest back-facing plane of the box, at point 448. Therefore, in this example, in step S316 it will be determined that a minimum distance condition is satisfied, i.e. it will be determined that the ray intersects the identified back-facing plane of the box 444 at a position 448 that is at least as far along the ray as the minimum culling distance, such that the ray 442 may intersect the box 444. Furthermore, in the example shown in FIG. 4c the maximum valid distance of the ray from the ray origin 452 is greater than the distance from the ray origin to the intersection of the ray with the furthest front-facing plane of the box, at point 446. Therefore, in this example, in step S318 it will be determined that a maximum distance condition is satisfied, i.e. it will be determined that the ray intersects the identified front-facing plane of the box 444 at a position 446 that is no further along the ray than the maximum culling distance, such that the ray 442 may intersect the box 444.

The results of one or more of steps S314, S316 and S318 are used in step S320. In step S320 the box intersection testing unit(s) 112 determines whether all three of the determinations performed in the respective steps S314, S316 and S318 are satisfied. If all three of these determinations are satisfied (i.e. if: (i) it is determined in step S314 that the ray intersects the identified front-facing plane no further along the ray than the position at which the ray intersects the identified back-facing plane, (ii) it is determined that the ray intersects the identified back-facing plane at a position that is at least as far along the ray as the minimum culling distance, and (iii) it is determined that the ray intersects the identified front-facing plane at a position that is no further along the ray than the maximum culling distance) then the method passes from step S320 to step S322 in which the box intersection testing unit(s) 112 determines that the ray intersects the box. On the other hand, if one or more of the three determinations are not satisfied (i.e. if: (i) it is determined in step S314 that the ray intersects the identified front-facing plane further along the ray than the position at which the ray intersects the identified back-facing plane, (ii) it is determined that the ray intersects the identified back-facing plane at a position that is less far along the ray than the minimum culling distance, or (iii) it is determined that the ray intersects the identified front-facing plane at a position that is further along the ray than the maximum culling distance) then the method passes from step S320 to step S324 in which the box intersection testing unit(s) 112 determines that the ray does not intersect the box, i.e. it misses the box.

Following step S322 or S324 the method passes to step S326 in which the intersection testing module 108 outputs an indication of the result of the determination of whether the ray intersects the box. This indication could be a binary indication (e.g. a one-bit flag) to indicate either a 'hit' or a 'miss' of the ray in respect of the box. In other examples, the indications could have different forms. In step S328, the outputted indication is used in the ray tracing system 100 (e.g. by the processing logic 110) for rendering an image of a 3D scene. For example, the box may bound geometry to be rendered in a scene. If the box corresponds to a node of a hierarchical acceleration structure to be used for performing intersection testing in the ray tracing system then the indication of whether the ray intersects the box can be used to determine whether to test the ray for intersection with boxes corresponding to any child nodes of the node corresponding to the intersected box. For example, if a ray intersects a box corresponding to a parent node then the ray is tested for intersection with boxes corresponding to the child nodes of that parent node, whereas if a ray does not intersect a box corresponding to a parent node then the ray is not tested for intersection with boxes corresponding to the child nodes of that parent node. If a ray intersects a box corresponding to a leaf node of the hierarchical acceleration structure then the ray can be tested for intersection with any geometry (e.g. triangles or other primitives) that are referenced by the leaf node.

In the example shown in FIGS. 3a and 3b, the tests performed in steps S314, S316 and S318 do not depend upon the results of one another. As such, in the example shown in FIGS. 3a and 3b, steps S314, S316 and S318 are performed in parallel in the box intersection testing unit(s) 112, but in other examples, one or more of these steps might not be performed in parallel with the other steps, e.g. they might be performed in sequence, one after another. The ordering of these three steps could be different in different examples, but just to give an example, step S314 could be performed, then step S316 could be performed and then step S318 could be performed. When steps S314, S316 and S318 have been performed, then method passes to step S320. Performing the tests in parallel may be particularly beneficial in implementations in which the box intersection testing unit(s) 112 are implemented in hardware, (e.g. in fixed function circuitry). In other examples (e.g. in which the box intersection testing unit(s) 112 are implemented in software, e.g. modules of computer code executed on a processing unit) the tests performed in steps S314, S316 and S318 may be performed sequentially wherein a second of the tests is performed only if a first test does not determine a miss for the ray with respect to the box, and a third of the tests is performed only if the first and second tests do not determine a miss for the ray with respect to the box. This sequential approach allows a miss to be determined without necessarily performing all of the tests of steps S314, S316 and S318 (if an earlier test in the sequence has determined a miss for the ray with respect to the box).

We now go on to describe in more detail how two examples can be implemented. A first example is described with reference to FIG. 5, and a second example is described with reference to FIG. 6.

In the first example, in step S308, the ray rescaling unit 116 determines the scaled ray components $\rho_u$ and $\rho_v$, such that $$\rho_u = \left|\frac{D_u}{D_w}\right| \text{ and}$$

$$\rho_v = \left|\frac{D_v}{D_w}\right|.$$

The third scaled ray component $$\rho_w = \left|\frac{D_w}{D_w}\right| = 1.$$

As described above, $D_u$, $D_v$, and $D_w$ are the components of a ray direction vector, D, for the ray, wherein $D_w$ is the major component of the ray direction vector. As described above, the selective permutation and/or reversal of the axes in step S306 is performed such that $D_w \geq D_u \geq 0$ and $D_w \geq D_v \geq 0$, and wherein for valid ray direction vectors $D_w > 0$.

In this first example, in step S310, a scaled minimum culling distance, $t_{min,scaled}$, is determined by the ray rescaling unit 116 using a result of multiplying an unscaled minimum culling distance for the ray, $t_{min,unscaled}$, by the magnitude of $D_w$. For example, $t_{min,scaled}$ may be determined as $t_{min,scaled}=D_w t_{min,unscaled}$. As described in more detail below, in other examples, $t_{min,scaled}$ may be determined as $t_{min,scaled}=D_w t_{min,unscaled}+B$, wherein B is a scalar value and wherein $B \leq 0$.

Furthermore, in this first example, in step S310, a scaled maximum culling distance, $t_{max,scaled}$, is determined by the ray rescaling unit 116 using a result of multiplying an unscaled maximum culling distance for the ray, $t_{max,unscaled}$, by the magnitude of $D_w$. For example, $t_{max,scaled}$ may be determined as $t_{max,scaled}=D_w t_{max,unscaled}$. As described in more detail below, in other examples, $t_{max,scaled}$, may be determined as $t_{max,scaled}=D_w t_{max,unscaled}+C$, wherein C is a scalar value and wherein $C \geq 0$.

Figure 5:
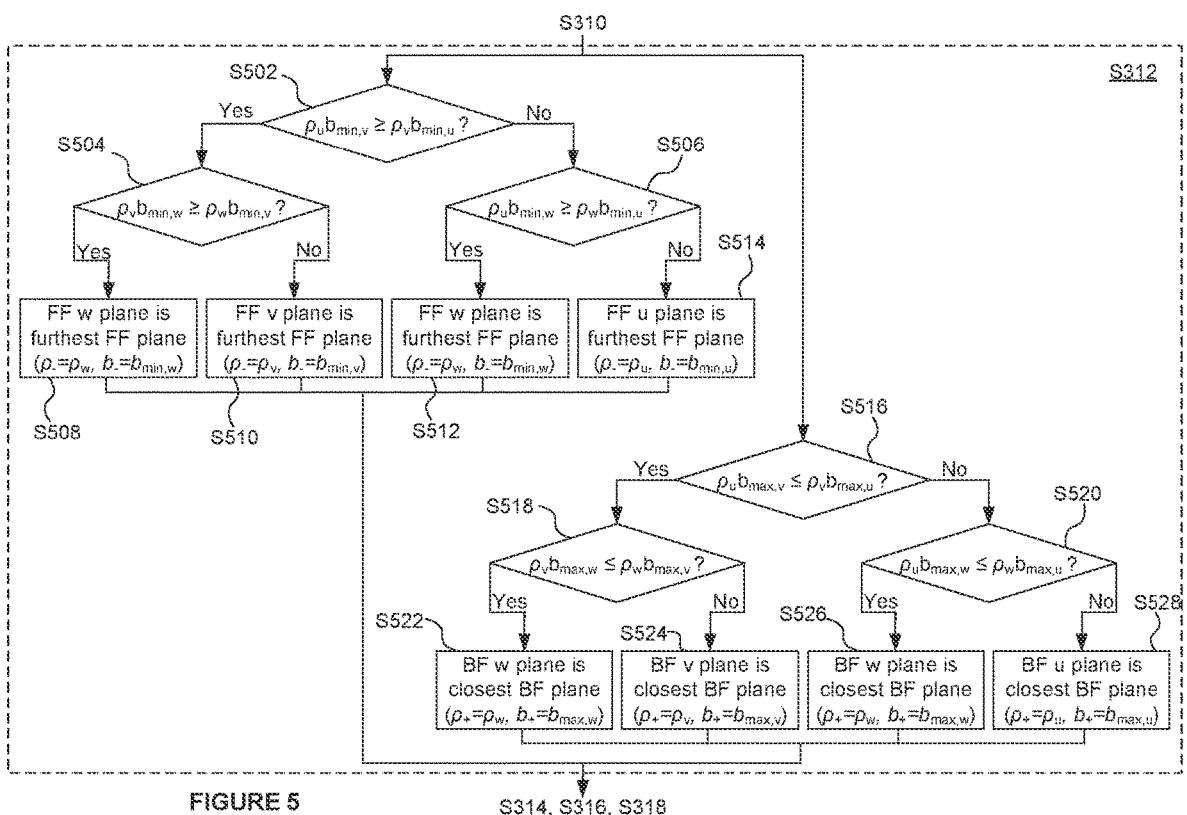
FIG. 5 is a flow chart for a first method of performing step S312 within a first embodiment of the method shown in the flow chart of FIGS. 3a and 3b.

FIG. 5 illustrates the steps that are performed by the box intersection testing unit(s) 112 during step S312 in the first example. Steps S502 to S514 are performed in order to identify which of the front-facing planes of the box intersects the ray furthest along the ray. Steps S516 to S528 are performed in order to identify which of the back-facing planes of the box intersects the ray least far along the ray.

As described above, a point on the ray 202 is given by O+Dt where O is the ray origin, D is the ray direction and t represents a distance along the ray from the origin. Due to step S304, the components of the remapped ray origin are all zero. A ray will intersect a position $Dt_1$ before it intersects a position $Dt_2$ if $t_1 < t_2$. The ray will intersect the front-facing plane for the u dimension when the parameter t has a value such that $D_u t=b_{min,u}$, where $b_{min,u}$ is the component value for the u dimension which is constant on that plane; and the ray will intersect the front-facing plane for the v dimension when the parameter t has a value such that $D_v t=b_{min,v}$, where $b_{min,v}$ is the component value for the v dimension which is constant on that plane. Therefore, the ray will intersect the front-facing plane for the u dimension before it intersects the front-facing plane for the v dimension if $$\frac{b_{min,u}}{D_u} < \frac{b_{min,v}}{D_v}.$$

However, performing division operations is typically more expensive (in terms of latency, silicon area and/or power consumption) than performing multiply operations, so rather than performing a comparison to compare values of $$\frac{b_{min,u}}{D_u} \text{ and } \frac{b_{min,v}}{D_v},$$

the method can instead perform a comparison to compare values of $b_{min,u}D_v$ and $b_{min,v}D_u$. In this way, the operations are cross-multiplied to avoid needing to perform a divide operation in the comparison. However, the ray components have been scaled (by a common factor), so rather than using values of $D_u$ and $D_v$, values of $\rho_u$ and $\rho_v$ are used. In particular, in step S502 the box intersection testing unit(s) 112 determines cross-multiplication values of $A\rho_u b_{min,v}$ and $A\rho_v b_{min,u}$, where A is a scalar value, e.g. a finite scalar constant greater than zero. For example, A might be 1. Step S502 then involves determining whether $\rho_u b_{min,v} \geq \rho_v b_{min,u}$ by comparing the determined cross multiplication values of $A\rho_u b_{min,v}$ and $A\rho_v b_{min,u}$.

If $\rho_u b_{min,v} > \rho_v b_{min,u}$ then it is determined that the ray intersects with the front-facing plane for the v dimension further along the ray than where the ray intersects with the front-facing plane for the u dimension, and the method passes from step S502 to step S504. On the other hand if $\rho_u b_{min,v} < \rho_v b_{min,u}$ then it is determined that the ray intersects with the front-facing plane for the u dimension further along the ray than where the ray intersects with the front-facing plane for the v dimension, and the method passes from step S502 to step S506. If $\rho_u b_{min,v} = \beta_v b_{min,u}$ then, in effect, the ray intersects the edge where the front-facing planes for the u and v dimensions meet. In this case it is equally valid to choose either plane as the "further", and the choice does not affect the validity of the testing process, so either one of the u and v front-facing planes can be chosen, but in the example shown in FIG. 5 the front-facing plane for the v dimension is chosen and the method passes from step S502 to step S504. Step S502 involves performing two multiply operations and a comparison of the results of the two multiply operations. Multiply and compare operations are not costly to implement in hardware relative to division or to subtract operations, e.g. they can be implemented in hardware (e.g. fixed-function circuitry) with a small silicon area. Therefore, implementing multiply and compare operations to determine whether $\rho_u b_{min,v} \geq \rho_v b_{min,u}$ is cheaper (e.g. in terms of silicon area) to implement in hardware than implementing division and compare operations to determine whether $$\frac{b_{min,v}}{\rho_v} \geq \frac{b_{min,u}}{\rho_u}$$

or implementing multiply and subtract operations to determine whether $\rho_u b_{min,v} - \rho_v b_{min,u} \geq 0$. It is noted that the $\rho_u$ and $\rho_v$ values are $\geq 0$ (and that special cases for $\rho_u = 0$ or $\rho_v = 0$ will be described later), such that the front-facing planes and back-facing planes have minimum and maximum constant components respectively. As described above, if any of the ray direction components are negative, the roles of these planes are exchanged, so that in order for the correct comparison to be performed, the maximum component is identified (rather than the minimum) as the front-facing plane for any negative direction component (or equivalently the signs of comparison in the tests described herein could be reversed). The selective reversal of axes therefore ensures that we have a consistent ordering of planes irrespective of the direction of the ray. If the reversal is not performed, the signs of both ray direction components and constant plane components are left unmodified, but will produce equivalent results in the comparison products. In either case, care must be taken to ensure that the correct planes are identified for comparison.

In step S504 the box intersection testing unit(s) 112 determines a cross-multiplication value of $A\rho_v b_{min,w}$. Step S504 also uses a value of $A\rho_w b_{min,v}$, but this value might not need to be actively calculated in step S504. In particular, due to the scaling of the ray components in step S308, $\rho_w = 1$, so $A\rho_w b_{min,v} = A b_{min,v}$. Furthermore, in some examples, the scalar value A=1, such that $A\rho_w b_{min,v} = b_{min,v}$. Step S504 then involves determining whether $\rho_v b_{min,w} \geq \rho_w b_{min,v}$ by comparing the values of $A\rho_v b_{min,w}$ and $A\rho_w b_{min,v}$.

If it is determined in step S504 that $\rho_v b_{min,w} \geq \rho_w b_{min,v}$ then the method passes to step S508 in which the front-facing plane for the w dimension is identified as being the front-facing plane of the box which intersects the ray furthest along the ray. On the other hand if it is determined in step S504 that $\rho_v b_{min,w} < \rho_w b_{min,v}$ then the method passes to step S510 in which the front-facing plane for the v dimension is identified as being the front-facing plane of the box which intersects the ray furthest along the ray. If it is determined in step S504 that $\rho_v b_{min,w} = \rho_w b_{min,v}$ then, in effect, the ray intersects the edge where the front-facing planes for the v and w dimensions meet. In this case it is equally valid to choose either plane as the "further", and the choice does not affect the validity of the testing process, so either one of the v and w front-facing planes can be chosen, but in the example shown in FIG. 5, in this situation, the front-facing plane for the w dimension is identified as being the front-facing plane of the box which intersects the ray furthest along the ray in step S508. Step S504 involves performing one or two multiply operations and a comparison operation. As noted above, multiply and compare operations are not costly to implement in hardware relative to division or to subtract operations, e.g. they can be implemented in hardware (e.g. fixed-function circuitry) with a small silicon area.

In step S506 the box intersection testing unit(s) 112 determines a cross-multiplication value of $A\rho_u b_{min,w}$. Step S506 also uses a value of $A\rho_w b_{min,u}$, but this value might not need to be actively calculated in step S506. In particular, due to the scaling of the ray components in step S308, $\rho_w = 1$, so $A\rho_w b_{min,u} = A b_{min,u}$. Furthermore, in some examples, the scalar value A=1, such that $A\rho_w b_{min,u} = b_{min,u}$. Step S506 then involves determining whether $\rho_u b_{min,w} \geq \rho_w b_{min,u}$ by comparing the values of $A\rho_u b_{min,w}$ and $A\rho_w b_{min,u}$.

If it is determined in step S504 that $\rho_u b_{min,w} > \rho_w b_{min,u}$ then the method passes to step S512 in which the front-facing plane for the w dimension is identified as being the front-facing plane of the box which intersects the ray furthest along the ray. On the other hand if it is determined in step S506 that $\rho_u b_{min,w} < \rho_w b_{min,u}$ then the method passes to step S514 in which the front-facing plane for the u dimension is identified as being the front-facing plane of the box which intersects the ray furthest along the ray. If it is determined in step S504 that $\rho_u b_{min,w} = \rho_w b_{min,u}$ then, in effect, the ray intersects the edge where the front-facing planes for the u and w dimensions meet. In this case it is equally valid to choose either plane as the "further", and the choice does not affect the validity of the testing process, so either one of the u and w front-facing planes can be chosen, but in the example shown in FIG. 5, in this situation, the front-facing plane for the w dimension is identified as being the front-facing plane of the box which intersects the ray furthest along the ray in step S512. Step S506 involves performing one or two multiply operations and a comparison operation. As noted above, multiply and compare operations are not costly to implement in hardware relative to division or to subtract operations, e.g. they can be implemented in hardware (e.g. fixed-function circuitry) with a small silicon area.

So steps S502 to S514 are used to identify the front-facing plane of the box which intersects the ray furthest along the ray using cross multiplication values.

In step S516, cross multiplication values of $A\rho_u b_{max,v}$ and $A\rho_v b_{max,u}$ are determined and compared to determine whether $\rho_u b_{max,v} \leq \rho_v b_{max,u}$. If $\rho_u b_{max,v} < \rho_v b_{max,u}$ then it is determined that the ray intersects with the back-facing plane for the v dimension less far along the ray than where the ray intersects with the back-facing plane for the u dimension, and the method passes from step S516 to step S518. On the other hand if $\rho_u b_{max,v} > \rho_v b_{max,u}$ then it is determined that the ray intersects with the back-facing plane for the u dimension less far along the ray than where it intersects with the back-facing plane for the v dimension, and the method passes from step S516 to step S520. If $\rho_u b_{max,v} = \rho_v b_{max,u}$ then, in effect, the ray intersects the edge where the back-facing planes for the u and v dimensions meet. In this case it is equally valid to choose either plane as the "closer", and the choice does not affect the validity of the testing process, so either one of the u and v back-facing planes can be chosen, but in the example shown in FIG. 5 the back-facing plane for the v dimension is chosen and the method passes from step S516 to step S518. Step S516 involves performing two multiply operations and a comparison of the results of the two multiply operations.

In step S518 the box intersection testing unit(s) 112 determines a cross-multiplication value of $A\rho_v b_{max,w}$. Step S518 also uses a value of $A\rho_w b_{max,v}$, but this value might not need to be actively calculated in step S518. In particular, due to the scaling of the ray components in step S308, $\rho_w=1$, so $A\rho_w b_{max,v}=Ab_{max,v}$. Furthermore, in some examples, the scalar value A=1, such that $A\rho_w b_{max,v}=b_{max,v}$. Step S518 then involves determining whether $\rho_v b_{max,w} \leq \rho_w b_{max,v}$ by comparing the values of $A\rho_v b_{max,w}$ and $A\rho_w b_{max,v}$. If it is determined in step S518 that $\rho_v b_{max,w} < \rho_w b_{max,v}$ then the method passes to step S522 in which the back-facing plane for the w dimension is identified as being the back-facing plane of the box which intersects the ray least far along the ray. On the other hand if it is determined in step S518 that $\rho_v b_{max,w} > \rho_w b_{max,v}$ then the method passes to step S524 in which the back-facing plane for the v dimension is identified as being the back-facing plane of the box which intersects the ray least far along the ray. If it is determined in step S518 that $\rho_v b_{max,w} = \rho_w b_{max,v}$ then, in effect, the ray intersects the edge where the back-facing planes for the v and w dimensions meet. In this case it is equally valid to choose either plane as the "closer", and the choice does not affect the validity of the testing process, so either one of the v and w back-facing planes can be chosen, but in the example shown in FIG. 5, in this situation, the back-facing plane for the w dimension is identified as being the back-facing plane of the box which intersects the ray least far along the ray in step S522. Step S518 involves performing one or two multiply operations and a comparison operation.

In step S520 the box intersection testing unit(s) 112 determines a cross-multiplication value of $A\rho_u b_{max,w}$. Step S520 also uses a value of $A\rho_w b_{max,u}$, but this value might not need to be actively calculated in step S520. In particular, due to the scaling of the ray components in step S308, $\rho_w=1$, so $A\rho_w b_{max,u}=Ab_{max,u}$. Furthermore, in some examples, the scalar value A=1, such that $A\rho_w b_{max,u}=b_{max,u}$. Step S520 then involves determining whether $\rho_u b_{max,w} \leq \rho_w b_{max,u}$ by comparing the values of $A\rho_u b_{max,w}$ and $A\rho_w b_{max,u}$.

If it is determined in step S520 that $\rho_u b_{max,w} < \rho_w b_{max,u}$ then the method passes to step S526 in which the back-facing plane for the w dimension is identified as being the back-facing plane of the box which intersects the ray least far along the ray. On the other hand if it is determined in step S520 that $\rho_u b_{max,w} > \rho_w b_{max,u}$ then the method passes to step S528 in which the back-facing plane for the u dimension is identified as being the back-facing plane of the box which intersects the ray least far along the ray. If it is determined in step S520 that $\rho_u b_{max,w} = \rho_w b_{max,u}$ then, in effect, the ray intersects the edge where the back-facing planes for the u and w dimensions meet. In this case it is equally valid to choose either plane as the "closer", and the choice does not affect the validity of the testing process, so either one of the u and w back-facing planes can be chosen, but in the example shown in FIG. 5, in this situation, the back-facing plane for the w dimension is identified as being the back-facing plane of the box which intersects the ray least far along the ray in step S526. Step S520 involves performing one or two multiply operations and a comparison operation.

So steps S516 to S528 are used to identify the back-facing plane of the box which intersects the ray least far along the ray using cross multiplication values. Steps S516 to S528 may be performed in parallel with steps S502 to S514 as shown in FIG. 5. Alternatively, steps S516 to S528 may be performed in series with steps S502 to S514.

As described in more detail below, zeros may be handled as special cases. For example, in a comparison of the form $\rho_i b_j \geq \rho_j b_i$ (where i and j are any of u, v or w), if $b_i=\rho_i=0$ then the comparison reduces to determining whether $0 \geq 0$ which does not provide any useful information. If $b_i=\rho_i=0$ this means that the ray lies in the $b_i$ plane. One way to handle this is to reject the plane $b_i$ (i.e. not identify it as the front-facing plane of the box which intersects the ray furthest along the ray and not identify it as the back-facing plane of the box which intersects the ray least far along the ray) if $b_i=\rho_i=0$.

As described above, the method passes from step S312 to steps S314, S316 and S318. In this example, step S314 comprises determining whether $A\rho_- b_+ \geq A\rho_+ b_-$. The values of $\rho_-$ and $b_-$ are the scaled ray component value and the front-facing box component value for the dimension for which the front-facing plane was identified in step S312. In particular, $\rho_-=\rho_u$ and $b_-=b_{min,u}$ if the front-facing plane for the u dimension is the identified front-facing plane which intersects the ray furthest along the ray; $\rho_-=\rho_v$ and $b_-=b_{min,v}$ if the front-facing plane for the v dimension is the identified front-facing plane which intersects the ray furthest along the ray; and $\rho_-=\rho_w=1$ and $b_-=b_{min,w}$ if the front-facing plane for the w dimension is the identified front-facing plane which intersects the ray furthest along the ray. The values of $\rho_+$ and $b_+$ are the scaled ray component value and the back-facing box component value for the dimension for which the back-facing plane was identified in step S312. In particular, $\rho_+=\rho_u$ and $b_+=b_{max,u}$ if the back-facing plane for the u dimension is the identified back-facing plane which intersects the ray least far along the ray; $\rho_+=\rho_v$ and $b_+=b_{max,v}$ if the back-facing plane for the v dimension is the identified back-facing plane which intersects the ray least far along the ray; and $\rho_+=\rho_w=1$ and $b_+=b_{max,w}$ if the back-facing plane for the w dimension is the identified back-facing plane which intersects the ray least far along the ray. It is noted that one or both of the values of $A\rho_- b_+$ and $A\rho_+ b_-$ may have been determined in step S312. If a value has already been determined in step S312 then it can be reused in step S314 without recalculating it, i.e. it can be stored in step S312 (e.g. in a memory that is part of the box intersection testing unit(s) 112) and then read during step S314. Furthermore, it is noted that since $\rho_w=1$, if either $\rho_-=\rho_w$ or $\rho_+=\rho_w$ then it can be simple to determine $A\rho_- b_+$ and/or $A\rho_+ b_-$. For example, if A=1 and $\rho_-=\rho_w$ then $A\rho_- b_+=b_+$, so no calculation is needed to determine the value of $A\rho_- b_+$. Similarly, if A=1 and $\rho_+=\rho_w$ then $A\rho_+ b_-=b_-$, so no calculation is needed to determine the value of $A\rho_+ b_-$. If $A\rho_- b_+ \geq A\rho_+ b_-$ then it is determined in step S314 that the ray intersects the identified front-facing plane no further along the ray than the position at which the ray intersects the identified back-facing plane. On the other hand, if $A\rho_- b_+ < A\rho_+ b_-$ then it is determined in step S314 that the ray intersects the identified front-facing plane further along the ray than the position at which the ray intersects the identified back-facing plane. In the examples described herein, A is positive. If A were negative then the inequalities given herein involving A on both sides of the inequalities would be reversed, e.g. a 'greater than' comparison would become a 'less than' comparison, for example, a test of $A\rho_- b^+ \geq A\rho_+ b_-$ would become a test of $A\rho_- b_+ \leq A\rho_+ b_-$.

It is noted that when calculations are performed in computing systems, the results are not always perfectly accurate. For example, when two numbers (e.g. in a floating point format) are multiplied together then the result may be rounded in order for the result to be representable in a particular format. The comparisons described herein, in which results of one or more multiplications are compared, may be performed as lossy comparisons. This means that each of the multiplications performed to determine the values to be compared may be evaluated inaccurately (e.g. due to rounding errors) and some tolerance is allowed in the comparison of the values. For example, when testing whether a≥b (assuming the terms are positive), the test can instead be performed as (α+δ)≥b, where δ is a small positive number, e.g. corresponding to one or more units of least precision ("ULPs") in the value of a. Alternatively, the test can be performed as a≤(b−δ), such that δ is instead given in terms of ULPs of b, so as to avoid relatively expensive subtraction (e.g. when b and/or a are represented by negative floating point values). As another example, when testing whether a≤b (assuming the terms are positive), the test can instead be performed as (a−δ)≤b, where δ is a small positive number, e.g. corresponding to one or more units of least precision ("ULPs") in the value of a. Alternatively, the test can be performed as a≤(b+δ), such that δ is instead given in terms of ULPs of b, so as to avoid relatively expensive subtraction (e.g. when b and/or a are represented by positive floating point values). The tolerance is designed so that any error in the box testing results is 'conservative'. This means that the errors in the box testing may provide false positive results, i.e. the errors may lead to a determination that a ray intersects a box when a perfectly accurate test would have found that the ray missed the box, but the errors cannot cause the box testing to provide false negative results, i.e. the errors cannot lead to a determination that a ray misses a box when a perfectly accurate test would have found that the ray intersected the box.

Furthermore, if the identified front-facing and back-facing planes are planes for the same dimension (i.e. if $\rho_-=\rho_+$) then in step S314 it is determined that the ray intersects the identified front-facing plane of the box at a position that is no further along the ray than the position at which the ray intersects the identified back-facing plane without performing any calculations in step S314. In other words, the determination as to whether the ray intersects the identified front-facing plane of the box at a position that is no further along the ray than the position at which the ray intersects the identified back-facing plane may comprise determining that the identified front-facing plane of the box and the identified back-facing plane of the box are planes for the same dimension. If this is the case then it can be determined that the ray does intersect the identified front-facing plane of the box at a position that is no further along the ray than the position at which the ray intersects the identified back-facing plane without any further calculations being performed in step S314. This is because for a particular dimension, by definition of the front-facing and back-facing planes, a ray will intersect the front-facing plane for that dimension no further along the ray than the position at which it intersects the back-facing plane for that dimension, i.e. $b_+>b_- \Rightarrow A\rho_- b_+ \geq A\rho_+ b_-$ (for $\rho_-=\rho_+$ and positive A).

Step S316 involves determining whether $t_{min,scaled} \leq b_+$. This can be determined by calculating a value of $\rho_+ t_{min,scaled}$ and then comparing that value to $b_+$. In this example, as described above, $$\rho_i = \left|\frac{D_i}{D_w}\right|,$$

where i∈{u, v, w}, and $t_{min,scaled}=D_w t_{min,unscaled}$. Therefore $\rho_+ t_{min,scaled}=D_+ t_{min,unscaled}$, and comparing this value to $b_+$ will determine whether the ray intersects the identified back-facing plane at a position that is at least as far along the ray as the minimum culling distance. In particular, if $\rho_+ t_{min,scaled} \leq b_+$ then it is determined that the ray intersects the identified back-facing plane at a position that is at least as far along the ray as the minimum culling distance; whereas, if $\rho_+ t_{min,scaled} > b_+$ then it is determined that the ray intersects the identified back-facing plane at a position that is less far along the ray than the minimum culling distance. If $\rho_+=\rho_w=1$ then step S316 does not involve a multiplication operation, and instead just involves a comparison operation, to compare the values of $t_{min,scaled}$ and $b_+$. This is simple to implement in hardware. It is stated above that, $$\rho_i = \left|\frac{D_i}{D_w}\right|,$$

where i∈{u, v, w}, and it is noted that in the main examples described herein the axes are selectively reversed so that $D_u \geq 0$, $D_v \geq 0$ and $D_w \geq 0$, so we don't need the modulus signs, such that $$\rho_i = \frac{D_i}{D_w}.$$

Step S318 involves determining whether $\rho_- t_{max,scaled} \geq b_-$. This can be determined by calculating a value of $\rho_- t_{max,scaled}$ and then comparing that value to $b_-$. In this example, as described above, $$\rho_i = \left|\frac{D_i}{D_w}\right|$$

(or just $$\rho_i = \frac{D_i}{D_w}$$

in examples where the axes are selectively reversed to ensure that $D_u \geq 0$, $D_v \geq 0$ and $D_w \geq 0$), where i∈{u, v, w} and $t_{max,scaled}=D_w t_{max,unscaled}$. Therefore $\rho_- t_{max,scaled}=D_- t_{max,unscaled}$, and comparing this value to $b_-$ will determine whether the ray intersects the identified front-facing plane at a position that is no further along the ray than the maximum culling distance. In particular, if $\rho_- t_{max,scaled} \geq b_-$ then it is determined that the ray intersects the identified front-facing plane at a position that is no further along the ray than the maximum culling distance; whereas, if $\rho_- t_{max,scaled} \leq b_-$ then it is determined that the ray intersects the identified front-facing plane at a position that is further along the ray than the maximum culling distance. If $\rho_-=\rho_w=1$ then step S318 does not involve a multiplication operation, and instead just involves a comparison operation, to compare the values of $t_{max,scaled}$ and $b_-$. This is simple to implement in hardware. As mentioned above, the comparisons described herein in which results of one or more multiplications are compared (which includes the determinations of whether $\rho_+ t_{min,scaled} \leq b_+$ and whether $\rho_- t_{max,scaled} \geq b_-$), may be performed as lossy comparisons.

This means that each of the one or more multiplications performed to determine the values to be compared may be evaluated inaccurately (e.g. due to rounding errors) and some tolerance is allowed in the comparison of the values to ensure that the box testing is conservative.

In this example, steps S320 to S324 involve determining that the ray intersects the box if all three of: (i) it is determined that the ray intersects the identified front-facing plane of the box at a position that is no further along the ray than the position at which the ray intersects the identified back-facing plane, (ii) it is determined that $\rho_- t_{max,scaled}$ is no less than $b_-$, and (iii) it is determined that $\rho_+ t_{min,scaled}$ is no greater than $b_+$, otherwise it is determined that the ray misses the box.

The method can be performed without computing intersection distances to any of the planes of the box. Instead, in this example, steps S312 and S314 involve performing comparisons to determine, for a pair of planes, which of the planes intersects the ray further along the ray, e.g. by comparing the values of cross-multiplications, which does not involve computing intersection distances to the planes of the box. An intersection distance to a plane of the box is the distance from the ray origin to the point on the plane where the ray intersects the plane.

In the examples described with reference to FIG. 5, cross multiplication values of $A\rho_u b_{min,v}$, $A\rho_v b_{min,u}$, $A\rho_u b_{max,v}$ and $A\rho_v b_{max,u}$ are determined in steps S502 and S516. Furthermore, a cross-multiplication value of one or both of: (i) $A\rho_u b_{min,w}$ and (ii) $A\rho_v b_{min,w}$ may be determined in steps S504, S506 or S314. Similarly, a cross-multiplication value of one or both of: (i) $A\rho_u b_{max,w}$ and (ii) $A\rho_v b_{max,w}$ may be determined in steps S518, S520 or S314.

In some situations only one of: (i) $A\rho_u b_{min,w}$ and (ii) $A\rho_v b_{min,w}$ may be determined. In these situations the method improves the efficiency of the box intersection testing process by not performing processing for determining one of these cross multiplication values. In particular, the method may comprise only determining each of the cross-multiplication values $A\rho_u b_{min,w}$ and $A\rho_v b_{min,w}$ if it is to be used in one or both of: (a) identifying which of the front-facing planes intersects the ray furthest along the ray (in step S504 or S506), and (b) determining whether the ray intersects the identified front-facing plane of the box at a position that is no further along the ray than the position at which the ray intersects the identified back-facing plane (in step S314). For example, the value of $A\rho_u b_{min,w}$ might not be determined if the method passes from step S502 to step S504 (and not to step S506), and if it is not the case that both: (i) the front-facing plane for the w dimension is identified as the furthest front-facing plane and (ii) the back-facing plane for the u dimension is identified as the closest back-facing plane (such that the value of $A\rho_u b_{min,w}$ is not used in step S314). As another example, the value of $A\rho_v b_{min,w}$ might not be determined if the method passes from step S502 to step S506 (and not to step S504), and if it is not the case that both: (i) the front-facing plane for the w dimension is identified as the furthest front-facing plane and (ii) the back-facing plane for the v dimension is identified as the closest back-facing plane (such that the value of $A\rho_v b_{min,w}$ is not used in step S314).

Similarly, in some situations only one of: (i) $A\rho_u b_{max,w}$ and (ii) $A\rho_v b_{max,w}$ may be determined. In these situations the method improves the efficiency of the box intersection testing process by not performing processing for determining one of these cross multiplication values. In particular, the method may comprise only determining each of the cross-multiplication values $A\rho_u b_{max,w}$ and $A\rho_v b_{max,w}$ if it is to be used in one or both of: (a) identifying which of the back-facing planes intersects the ray least far along the ray (in step S518 or S520), and (b) determining whether the ray intersects the identified front-facing plane of the box at a position that is no further along the ray than the position at which the ray intersects the identified back-facing plane (in step S314). For example, the value of $A\rho_u b_{max,w}$ might not be determined if the method passes from step S516 to step S518 (and not to step S520), and if it is not the case that both: (i) the front-facing plane for the u dimension is identified as the furthest front-facing plane and (ii) the back-facing plane for the w dimension is identified as the closest back-facing plane (such that the value of $A\rho_u b_{max,w}$ is not used in step S314). As another example, the value of $A\rho_v b_{max,w}$ might not be determined if the method passes from step S516 to step S520 (and not to step S518), and if it is not the case that both: (i) the front-facing plane for the v dimension is identified as the furthest front-facing plane and (ii) the back-facing plane for the w dimension is identified as the closest back-facing plane (such that the value of $A\rho_v b_{max,w}$ is not used in step S314).

A benefit comes in the example described with reference to FIG. 5 because the number of multiplication operations that are performed can be reduced compared to the prior art. For example, some of the results of the multiplications can be shared between steps S312, S314, S316 and/or S318 (such that the processing involved in calculating those multiplication values is not duplicated) and some multiplications can be avoided altogether due to the scaling of the ray components and the minimum and maximum culling distances.

In particular, if the identified front-facing plane and the identified back-facing plane are both planes for the same dimension (i.e. if $\rho_-=\rho_+$) then step S314 does not involve any multiplication operations. It can be appreciated that $\rho_- b_+ \geq \rho + b_-$ is automatically satisfied when $\rho_-=\rho_+$ due to the definition of the front-facing and back-facing planes defining the axis-aligned box. So this situation is simplified by the method of this example.

If the w front-facing plane is identified in step S312 (i.e. if $\rho_-=\rho_w=1$) then step S318 does not involve any multiplication operations: instead, it just involves comparing $t_{max,scaled}$ and $b_{min,w}$. Furthermore, in step S314, $\rho_- b_+ = b_+$, so no multiplication is needed to calculate the value of $\rho_- b_+$. So this situation is simplified by the method of this example.

If the w back-facing plane is identified in step S312 (i.e. if $\rho_+=\rho_w=1$) then step S316 does not involve any multiplication operations: instead, it just involves comparing $t_{min,scaled}$ and $b_{max,w}$. Furthermore, in step S314, $\rho_+ b_- = b_-$, so no multiplication is needed to calculate the value of $\rho_+ b_-$. So this situation is simplified by the method of this example.

If the u front-facing plane and the v back-facing plane are identified in step S312 (i.e. if $\rho_-=\rho_u$ and $\rho_+=\rho_v$) then step S314 involves determining whether $\rho_u b_{max,v} \geq \beta_v b_{min,u}$, wherein values of $A\rho_v b_{min,u}$ and $A\rho_u b_{max,v}$ have been determined in steps S502 and S516 respectively, so they can be reused in step S314 without performing any further multiplication operations in step S314. So this situation is simplified by the method of this example.

If the v front-facing plane and the u back-facing plane are identified in step S312 (i.e. if $\rho_-=\rho_v$ and $\rho_+=\rho_u$) then step S314 involves determining whether $\rho_v b_{max,u} \geq \rho_u b_{min,v}$, wherein values of $A\rho_u b_{min,v}$ and $A\rho_v b_{max,u}$ have been determined in steps S502 and S516 respectively, so they can be reused in step S314 without performing any further multiplication operations in step S314. So this situation is simplified by the method of this example.

Therefore, all situations in which different combinations of planes are identified as the identified front-facing plane and the identified back-facing plane are simplified in various ways by the method of this example. This simplification (e.g. reduction in multiplication operations that need to be performed) results in benefits in the hardware, such as reduced silicon area, reduced power consumption and reduced latency.

The above simplifications can be combined by noting that, in addition to the products that have been determined in steps S502 and S516 (i.e. values of $A\rho_u b_{min,v}$, $A\rho_v b_{min,u}$, $A\rho_u b_{max,v}$ and $A\rho_v b_{max,u}$), at most two further products are required to determine the comparisons in steps S314, S316 and S318. In some examples, an implementation may choose to evaluate for a first product a value of $A\rho_- b_+$ when $\rho_+ = \rho_w = 1$ or instead $\rho_+ t_{min,scaled}$ when $\rho_+ \neq \rho_w$. Note that this decision may be made on the basis of the numerical value of $\rho_+$ or as a result of step S522 or step S526 indicating that the ray does not intersect any back-facing plane before the back-facing w plane. The value of $\rho_+ t_{min,scaled}$, as used by step S316, is given by this first product when $\rho_+ \neq \rho_w$ and $t_{min,scaled}$ directly when $\rho_+ = \rho_w = 1$. The value of $A\rho_- b_+$, as used by step S314, is given by this first product when $\rho_+ = \rho_w = 1$. Otherwise, there are three cases to consider. If $\rho_+ \neq \rho_w$ and $\rho_- = \rho_w = 1$ then $A\rho_- b_+$ is either $Ab_{max,v}$ or $Ab_{max,u}$, and in examples in which A=1 then $A\rho_- b_+$ is given directly by either $b_{max,v}$ or $Ab_{max,u}$. If $\rho_+ \neq \rho_w$ and $\rho_+ \neq \rho_- \neq \rho_w$ then $A\rho_- b_+$ is given by $A\rho_u b_{max,v}$ or $A\rho_v b_{max,u}$, both evaluated in step S516. Otherwise, if $\rho_+ = \rho_-$, step S314 passes automatically.

For a second product, an implementation may choose to evaluate a value of $A\rho_+ b_-$ when $\rho_- = \rho_w = 1$ or instead $\rho_- t_{max,scaled}$ when $\rho_- \neq \rho_w$. Note that this decision may be made on the basis of the numerical value of $\rho_-$ or as a result of step S508 or step S512 indicating that the ray does not intersect any front-facing plane after the front-facing w plane. The value of $\rho_- t_{max,scaled}$, as used by step S318, is given by this second product when $\rho_- \neq \rho_w$ and $t_{max}$ directly when $\rho_- = \rho_w = 1$. The value of $A\rho_+ b_-$, as used by step S314, is given by this second product when $\rho_- = \rho_w = 1$. If $\rho_- \neq \rho_w$ and $\rho_+ = \rho_w = 1$ then $A\rho_+ b_-$ is either $Ab_{min,v}$ or $Ab_{min,u}$, and in examples in which A=1 then $A\rho_+ b_-$ is given directly by either $b_{min,v}$ or $b_{min,u}$. If $\rho_- \neq \rho_w$ and $\rho_+ \neq \rho_- \neq \rho_w$ then $A\rho_+ b_-$ is given by $A\rho_u b_{min,v}$ or $A\rho_v b_{min,u}$, both evaluated in step S502. Otherwise, if $\rho_+ = \rho_-$, step S314 passes automatically.

There is some redundancy in the above calculations. Firstly, if $\rho_+ = \rho_- = \rho_w = 1$ no multiplication is required in steps S314, S316 and S318 and in fact step S314 passes automatically. Secondly, if either $\rho_+ = \rho_w$ or $\rho_- = \rho_w$ (but $\rho_+ \neq \rho_-$), then potentially only one multiplication is required if the products in steps S504, S506, S518 or S520 are reused. Since we wish to avoid redundant comparison in these stages (it doesn't benefit us to reduce redundancy in step S314 while increasing it elsewhere), we rely on the single product (one of $\rho_+$ or $\rho_-$ is $\rho_w = 1$) used by step S314, either $A\rho_v b_{min,w}$, $A\rho_u b_{min,w}$, $A\rho_v b_{max,w}$ or $A\rho_u b_{max,w}$ assuming neither $\rho_u$ or $\rho_v$ is one, to match, in the case of $A\rho_v b_{min,w}$ or $A\rho_u b_{min,w}$ whichever product was determined in accordance with whether step S504 or step S506 was performed or, in the case of $A\rho_v b_{max,w}$ or $A\rho_u b_{max,w}$, whichever product was determined in accordance with whether step S518 or step S520 was performed. If either $\rho_u$ or $\rho_v$ is one, the assumption that the w plane is either the furthest front-facing or least far back-facing plane may fail (i.e. if we decide which products to calculate based on the numerical values of $\rho_-$ and/or $\rho_+$ rather than the knowledge that the w plane is either the furthest front-facing plane or least far back-facing plane), but in this case the required product is available from steps S502 and S516 (and additional simplification is possible since fewer products are required in steps S502 through S528).

In some examples, it may be beneficial to identify these additional redundancies to further reduce the computational workload of the intersection tester. However, in other examples, e.g. when the functionality is implemented in fixed function circuitry, the intersection testing module is configured to handle the worst case scenario, which here means that two multiplications are calculated to perform steps S314, S316 and S318. With this limiting factor (i.e. accepting that two multiplications are to be calculated for steps S314, S316 and S318 even though sometimes less than two multiplications might be needed), the data selection logic can be simplified (which may improve latency on the critical path) by performing redundant calculations (with equivalent results) in place of testing for special cases. In particular, with reference to the pairs of products defined above, we note again that step S314 passes automatically if $\rho_+ = \rho_- \neq \rho_w$ (note that this step may pass automatically if $\rho_+ = \rho_- = \rho_w$, but further depends on the ray intersecting opposite faces of the box, which may not be the case if either $\rho_u = \rho_w$ or $\rho_v = \rho_w$ i.e. where the front-facing plane and back-facing plane are associated with different dimensions). However, we may avoid explicitly identifying this case by either performing a comparison of the form $b_{max,u} \geq b_{min,u}$, $b_{max,v} \geq b_{min,v}$, $A\rho_v b_{max,u} \geq A\rho_v b_{min,u}$ or $A\rho_u b_{max,u} \geq A\rho_u b_{min,u}$, all of whose terms have been pre-computed. This enables us to select the same products for comparison, irrespective of whether $\rho_+ = \rho_-$. The value of $\rho_- b_+$, as used by step S314, is given, as above, by the first product when $\rho_+ = p_w = 1$. Otherwise, there are now two cases to consider (three previously). If $\rho_+ \neq \rho_w$ and $\rho_- = \rho_w = 1$ then $A\rho_- b_+$ is either $Ab_{max,v}$ or $Ab_{max,u}$, and in examples in which A=1 then $A\rho_- b_+$ is given directly by either $b_{max,v}$ or $b_{max,u}$. If $\rho_+ \neq \rho_w$ and $\rho_+ \neq \rho_w$ then $A\rho_- b_+$, or its replacement redundant comparison term, is given by $A\rho_u b_{max,v}$ or $A\rho_v b_{max,u}$, both evaluated in step S516. The value of $A\rho_+ b_-$, as used by step S314, is given by the second product when $\rho_- = \rho_w = 1$. If $\rho_- \neq \rho_w$ and $\rho_+ = \rho_w = 1$ then $A\rho_+ b_-$ is either $Ab_{min,v}$ or $Ab_{min,u}$, and in examples in which A=1 then $A\rho_+ b_-$ is given directly by either $b_{min,v}$ or $b_{min,u}$. If $\rho_- \neq \rho_w$ and $\rho_+ \neq \rho_w$ then $A\rho_+ b_-$, or its replacement redundant comparison term, is given by $A\rho_u b_{min,v}$ or $A\rho_v b_{min,u}$, both evaluated in step S502.

Furthermore, the selection of comparison terms needed by step S314 may be made on the basis of steps S516 through S528. In particular, since $b_+ = b_{max,v}$ as result of step S524, the product $A\rho_u b_{max,v}$ may be stored at step S518 without the need to store $A\rho_v b_{max,u}$. Likewise, since $b_+ = b_{max,u}$ as a result of step S528, the product $A\rho_v b_{max,u}$ may be stored at step S520 without the need to store $A\rho_u b_{max,v}$. Similarly, since $b_- = b_{min,v}$ as result of step S510, the product $A\rho_u b_{min,v}$ may be stored at step S504 without the need to store $A\rho_v b_{min,u}$. Likewise, since $b_- = b_{min,u}$ as a result of step S514, the product $A\rho_v b_{min,u}$ may be stored at step S506 without the need to store $A\rho_u b_{min,v}$.

Figure 6:
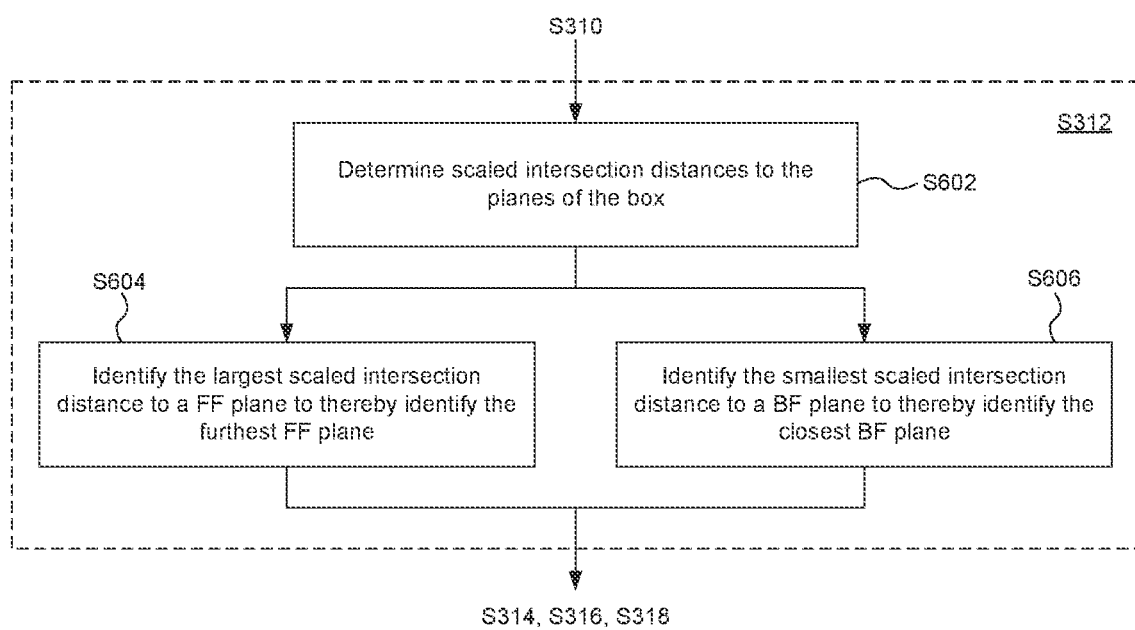
FIG. 6 is a flow chart for a second method of performing step S312 within a second embodiment of the method shown in the flow chart of FIGS. 3a and 3b.

We now go on to describe in more detail a second example with reference to FIG. 6. In the second example, in step S308, the ray rescaling unit 116 determines the scaled ray components $\rho_u$ and $\rho_v$, such that they are scaled inverse ray components, wherein $$\rho_u = \left|\frac{AD_w}{D_u}\right| \text{ and } \rho_v = \left|\frac{AD_w}{D_v}\right|.$$

The third scaled inverse ray component $$\rho_w = \left|\frac{AD_w}{D_w}\right| = |A|.$$

As described above, $D_u$, $D_v$ and $D_w$ are the components of a ray direction vector, D, for the ray, wherein $D_w$ is the major component of the ray direction vector. A is a scalar value, e.g. a finite non-zero scalar constant. In examples described herein A is positive. As an example, A=1. As described above, the selective permutation and/or reversal of the axes in step S306 is performed such that $D_w \geq D_u \geq 0$ and $D_w \geq D_v \geq 0$, and wherein for valid ray direction vectors $D_w > 0$. The scaled ray components in this example are referred to as "scaled inverse ray components" or "scaled reciprocal ray components" because a ray component $\rho_i$ (with $i \in \{u, v, w\}$) is determined by dividing a value by $D_i$.

In this second example, in step S310, a scaled minimum culling distance, $t_{min,scaled}$, is determined by the ray rescaling unit 116 using a result of multiplying an unscaled minimum culling distance for the ray, $t_{min,unscaled}$, by the magnitude of $AD_w$. For example, $t_{min,scaled}$ may be determined as $t_{min,scaled} = AD_w t_{min,unscaled}$. As described in more detail below, in other examples, $t_{min,scaled}$, may be determined as $t_{min,scaled} = AD_w t_{min,unscaled} + B$, wherein B is a scalar value and wherein $B \leq 0$.

Furthermore, in this second example, in step S310, a scaled maximum culling distance, $t_{max,scaled}$, is determined by the ray rescaling unit 116 using a result of multiplying an unscaled maximum culling distance for the ray, $t_{max,unscaled}$, by the magnitude of $AD_w$. For example, $t_{max,scaled}$ may be determined as $t_{max,scaled} = AD_w t_{max,unscaled}$. As described in more detail below, in other examples, $t_{max,scaled}$, may be determined as $t_{max,scaled} = AD_w t_{max,unscaled} + C$, wherein C is a scalar value and wherein $C \geq 0$.

FIG. 6 illustrates the steps that are performed by the box intersection testing unit(s) 112 during step S312 in the second example. In step S602 the box intersection testing unit(s) 112 determines scaled intersection distances to the planes defining the box using the scaled inverse ray components. In particular, step S602 comprises:

determining a scaled intersection distance $\tau_{u,min}$ to the front-facing plane for the u dimension by multiplying $b_{min,u}$ and $\rho_u$, e.g. $\tau_{u,min} = \rho_u b_{min,u}$;

determining a scaled intersection distance $\tau_{u,max}$ to the back-facing plane for the u dimension by multiplying $b_{max,u}$ and $\rho_u$, e.g. $\tau_{u,max} = \rho_u b_{max,u}$;

determining a scaled intersection distance $\tau_{v,min}$ to the front-facing plane for the v dimension by multiplying $b_{min,v}$ and $\rho_v$, e.g. $\tau_{v,min} = \rho_v b_{min,v}$;

determining a scaled intersection distance $\tau_{v,max}$ to the back-facing plane for the v dimension by multiplying $b_{max,v}$ and $\rho_v$, e.g. $\tau_{v,max} = \rho_v b_{max,v}$;

determining a scaled intersection distance $\tau_{w,min}$ to the front-facing plane for the w dimension, such that $\tau_{w,min} = b_{min,w} \rho_w$; and determining a scaled intersection distance $\tau_{w,max}$ to the back-facing plane for the w dimension, such that $\tau_{w,max} = b_{max,w} \rho_w$.

It is noted that $$\rho_w = \left|\frac{AD_w}{D_w}\right| = |A|,$$

and that in some examples A=1, such that $\rho_w = 1$. In these examples, $\tau_{w,min} = b_{min,w}$ and $\tau_{w,max} = b_{max,w}$, such that no calculations need to be performed in step S602 in order to determine $\tau_{w,min}$ and $\tau_{w,max}$. To give some other examples, A may be a power of two (e.g. 2, 4, 8, 16, etc.) or a lower precision floating point value whose product may be evaluated at low cost.

It is also noted that the determinations of the scaled intersection distances in step S602 involve multiplication operations, not division operations. As mentioned above, multiplication operations are much simpler to implement in hardware than division operations and so can be implemented with smaller silicon area, reduced power consumption and/or reduced latency. It is the use of the scaled inverse ray components that allows step S602 to be performed with multiplication operations rather than division operations. Furthermore, it is noted that the scaled inverse ray components may be supplied in this format or can be determined once for a ray and then used many times for intersection tests involving the ray. In particular, the scaled inverse ray components, the scaled minimum culling distance and the scaled maximum culling distance for the ray may be used to determine whether the ray intersects a plurality of axis-aligned boxes in the ray tracing system. As such, although the determination of the scaled inverse ray components involves a division operation, the cost of performing this division operation is amortized over many intersection tests, wherein for each intersection test involving the ray, the process is simpler due to the use of the scaled inverse ray components. As an example, a ray may be involved in hundreds or thousands of intersection tests.

With the scaled inverse ray components in this example, it is possible for $\rho_u$ and/or $\rho_v$ to be $-\infty$ or $+\infty$. It is possible for the box components to be zero. Therefore, it is possible for the determination of a scaled intersection distance $\tau$ to be 0 multiplied by $\pm\infty$, which is undefined. If $b_i = 0$ and $\rho_i = \pm\infty$ (where i is u or v) this means that the ray lies in the $b_i$ plane. One way to handle this is to set $\tau_{u} = 0 * \pm\infty$ to be $-\infty$ for front-facing planes, and to set $\tau_{u} = 0 * \pm\infty$ to be $\pm\infty$ for back-facing planes. This would ensure that the plane is rejected (i.e. it is not identified as the front-facing plane of the box which intersects the ray furthest along the ray and it is not identified as the back-facing plane of the box which intersects the ray least far along the ray).

In step S604 the box intersection testing unit(s) 112 identifies the largest (or "greatest") of the determined scaled intersection distances to a front-facing plane of the box, thereby identifying the front-facing plane of the box which intersects the ray furthest along the ray (when looking along the direction of the ray from $-\infty$). This is done by finding the maximum of $\tau_{u,min}$, $\tau_{v,min}$ and $\tau_{w,min}$. It is noted that it is possible for one or more of $\tau_{u,min}$, $\tau_{v,min}$ and $\tau_{w,min}$ to be negative, and in this case the largest of the determined scaled intersection distances to a front-facing plane of the box is determined by comparing the signed values of $\tau_{u,min}$, $\tau_{u,min}$ and $\tau_{w,min}$ to find the maximum of these three signed values (rather than comparing their magnitudes). Methods for finding the maximum of three numbers are known in the art. The identified (largest) of the scaled intersection distances to a front-facing plane of the box is denoted $\tau_-$ and may represent a scaled intersection distance from the ray origin to a point at which the ray enters the box.

In step S606 the box intersection testing unit(s) 112 identifies the smallest of the determined scaled intersection distances to a back-facing plane of the box, thereby identifying the back-facing plane of the box which intersects the ray least far along the ray (when looking along the direction of the ray from $-\infty$). This is done by finding the minimum of $\tau_{u,max}$, $\tau_{v,max}$ and $\tau_{w,max}$. It is noted that it is possible for one or more of $\tau_{u,max}$, $\tau_{v,max}$ and $\tau_{w,max}$ to be negative, and in this case the smallest of the determined scaled intersection distances to a back-facing plane of the box is determined by comparing the signed values of $\tau_{u,max}$, $\tau_{v,max}$ and $\tau_{w,max}$ to find the maximum of these three signed values (rather than comparing their magnitudes). Methods for finding the minimum of three numbers are known in the art. The identified (smallest) of the scaled intersection distances to a back-facing plane of the box is denoted $\tau_+$ and may represent a scaled intersection distance from the ray origin to a point at which the ray exits the box.

Steps S604 and S606 may be performed in parallel as illustrated in FIG. 6. Alternatively, they may be performed in series.

In step S314 the box intersection testing unit(s) 112 determines whether the identified largest scaled intersection distance to a front-facing plane of the box ($\tau_-$) is not greater than the identified smallest scaled intersection distance to a back-facing plane of the box ($\tau_+$), i.e. it determines whether $\tau_- \leq \tau_+$. This is a simple comparison which involves no further calculations, e.g. no multiplication, addition, subtraction or division operations. In this way, step S314 determines whether the ray intersects the identified front-facing plane no further along the ray (when looking along the direction of the ray from $-\infty$) than the position at which the ray intersects the identified back-facing plane. It is noted again that it is possible for one or more of $\tau_-$ and $\tau_+$ to be negative, and in this case the comparison of $\tau_-$ and $\tau_+$ involves comparing the signed values of $\tau_-$ and $\tau_+$ (rather than comparing their magnitudes).

In step S316 the box intersection testing unit(s) 112 determines whether the identified smallest scaled intersection distance to a back-facing plane of the box ($\tau_+$) is not less than the scaled minimum culling distance, $t_{min,scaled}$, i.e. it determines whether $\tau_+ \geq t_{min,scaled}$. This is a simple comparison which involves no further calculations, e.g. no multiplication, addition, subtraction or division operations. In this way, step S316 determines whether the ray intersects the identified back-facing plane at a position that is at least as far along the ray (when looking along the direction of the ray from $-\infty$) as the minimum culling distance. It is noted that it is possible for one or more of $\tau_+$ and $t_{min,scaled}$ to be negative, and in this case the comparison of $\tau_+$ and $t_{min,scaled}$ involves comparing the signed values of $\tau_+$ and $t_{min,scaled}$ (rather than comparing their magnitudes).

In step S318 the box intersection testing unit(s) 112 determines whether the identified largest scaled intersection distance to a front-facing plane of the box ($\tau_-$) is not greater than the scaled maximum culling distance, $t_{max,scaled}$ i.e. it determines whether $\tau_- \leq t_{max,scaled}$. This is a simple comparison which involves no further calculations, e.g. no multiplication, addition, subtraction or division operations. In this way, step S318 determines whether the ray intersects the identified front-facing plane at a position that is no further along the ray (when looking along the direction of the ray from $-0.0$) than the maximum culling distance. It is noted that it is possible for one or more of $\tau_-$ and $t_{max,scaled}$ to be negative, and in this case the comparison of $\tau_-$ and $t_{max,scaled}$ involves comparing the signed values of $\tau_-$ and $t_{max,scaled}$ (rather than comparing their magnitudes).

As described above, in step S320, it is determined whether all three of the determinations in steps S314, S316 and S318 are satisfied, and if so the method passes to step S322 in which the box intersection testing unit(s) 112 determines that the ray intersects the box; whereas if one or more of the determinations in steps S314, S316 and S318 are not satisfied then the method passes from step S320 to step S324 in which the box intersection testing unit(s) 112 determines that the ray does not intersect the box, i.e. it determines that the ray misses the box. Therefore, in this example, if all of: (i) $\tau_- \leq \tau_+$, (ii) $\tau_+ t_{min,scaled}$, and (iii) $\tau_- \leq t_{max,scaled}$ are satisfied then it is determined that the ray intersects the box; otherwise, it is determined that the ray misses the box.

As described above, in the example shown in FIG. 3b, steps S314, S316 and S318 are performed in parallel, but in other examples they may be performed in sequence. Also as described above, following step S322 or S324, in step S324 the intersection testing module 108 outputs an indication of the result of the determination of whether the ray intersects the axis-aligned box, and in step S328 the outputted indication is used in the ray tracing system for rendering an image of a 3D scene.

As described above, the use of the scaled inverse ray components, the scaled minimum culling distance and the scaled maximum culling distance simplifies the calculations that are performed by the box intersection testing unit(s) 112. In particular, divide operations are performed for determining the scaled inverse ray components in the ray rescaling unit 116 to determine the scaled inverse ray components which can then be used multiple times by the box intersection testing unit(s) 112 (and by the triangle intersection testing unit(s) 114), wherein a scaled inverse ray component can simply be multiplied by a box component for a plane to determine a scaled intersection distance to the plane. The scaled inverse ray components, the scaled minimum culling distance and the scaled maximum culling distance can be determined once and then used in multiple intersection tests. In other words, the scaled inverse ray components, the scaled minimum culling distance and the scaled maximum culling distance for the ray may be used to determine whether the ray intersects a plurality of axis-aligned boxes (and/or a plurality of triangles) in the ray tracing system. In order to do this when the scaled inverse ray components, the scaled minimum culling distance and the scaled maximum culling distance for the ray have been determined they can be stored, e.g. in a memory on the intersection testing module 108, so that they can be read and used multiple times by the box intersection testing unit(s) 112 and the triangle intersection testing unit(s) 114 without needing to recalculate them. It is further noted that although scaled intersection distances are determined to the planes of the box, the method can be performed without computing unscaled intersection distances to any of the planes of the box.

As mentioned above, in some examples, an early rejection test (step S311) can be performed between steps S310 and S312. The early rejection test may be able to determine that the ray misses the box without needing to perform the operations of steps S312 to S322. In particular, the early rejection test uses the signs of $t_{min,scaled}$ and $t_{max,scaled}$, and the signs of $b_{min,u}$, $b_{min,v}$, $b_{min,w}$, $b_{max,u}$, $b_{max,v}$ and $b_{max,w}$ to determine whether the ray misses the box.

Figure 7:
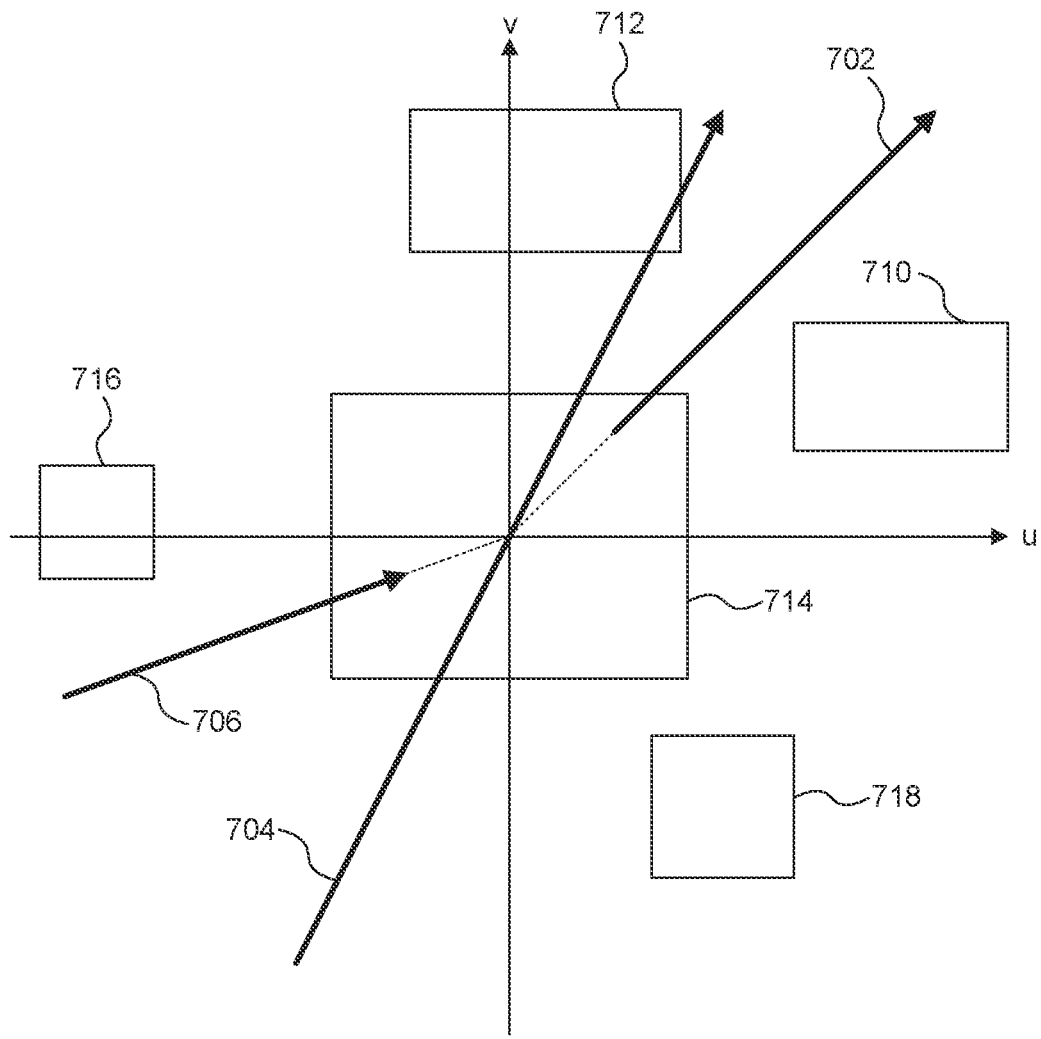
FIG. 7 shows three rays and five boxes for which an early rejection test may or may not be implemented.

FIG. 7 shows three rays 702, 704 and 706, and five axis-aligned boxes 710, 712, 714, 716 and 718. FIG. 7 shows the rays and the boxes after the translation of step S304 and after the selective permutation and/or selective reversal of the axes in step S306. So the origins of the rays are all at the origin of the coordinate system, and the components of the ray direction vectors are all positive. For simplicity of explanation, FIG. 7 is a two dimensional (2D) illustration, just showing the u and v axes, although it will be understood that the same principles described with reference to FIG. 7 can be applied to a 3D system.

If the minimum and maximum culling distances are both non-negative (i.e. if $t_{min,scaled} \geq 0$ and $t_{max,scaled} \geq 0$) then the early rejection test of step S311 can involve determining whether $b_{max,u} \geq 0$, $b_{max,v} \geq 0$ and $b_{max,w} \geq 0$. It is noted that a value (e.g. $t_{min,scaled}$ or $t_{max,scaled}$) is non-negative if it is greater than zero or if it is equal to zero. A floating point value of zero may have a positive or negative sign bit, such that +0 and −0 can be represented in a floating point format. As described in more detail below, values of zero may be replaced with very small, but non-zero values, such that zeros do not need to be handled as special cases. If $t_{min,scaled}$ and $t_{max,scaled}$ cannot equal zero then the determination of whether $t_{min,scaled} \geq 0$ and $t_{max,scaled} \geq 0$ can be performed simply by checking the sign bits of $t_{min,scaled}$ and $t_{max,scaled}$. If the minimum and maximum culling distances are both positive for a ray then the ray is only validly present in the all-positive octant of the coordinate system. In this situation, if $b_{max,u} \geq 0$, $b_{max,v} \geq 0$ and $b_{max,w} \geq 0$ then the box at least partially overlaps with the all-positive octant of the coordinate system, so the intersection test is not rejected in step S311 and the method carries on to step S312 as described above. However, if one or more of $b_{max,u} < 0$, $b_{max,v} < 0$ and $b_{max,w} < 0$ then the box is not present in the all-positive octant of the coordinate system, so it can be determined that the ray misses the box without performing steps S312 to S322, and the method passes from step S311 to step S324. In the 2D example shown in FIG. 7, the minimum and maximum culling distances for the ray 702 are both positive. This means that the ray 702 is only validly present within the positive quadrant of the u,v coordinate system. The boxes 710, 712 and 714 all have $b_{max,u} \geq 0$ and $b_{max,v} \geq 0$, so they all at least partially overlap with the positive quadrant, so the early rejection test cannot determine whether the ray 702 intersects or misses boxes 710, 712 or 714, and the method will pass from step S311 to step S312 in these situations. However, box 716 has $b_{max,u} < 0$, which means that box 716 does not overlap with the positive quadrant of the u,v coordinate system (because all of the positions within the box 716 have negative u components), so it can be determined in step S311 that the ray 702 does not intersect the box 716, and the method will pass from step S311 to step S324 in this situation. Similarly, box 718 has $b_{max,v} < 0$, which means that box 718 does not overlap with the positive quadrant of the u,v coordinate system (because all of the positions within the box 718 have negative v components), so it can be determined in step S311 that the ray 702 does not intersect the box 718, and the method will pass from step S311 to step S324 in this situation.

If the minimum and maximum culling distances are both non-positive (i.e. if $t_{min,scaled} \leq 0$ and $t_{max,scaled} \leq 0$) then the early rejection test of step S311 can involve determining whether $b_{min,u} \leq 0$, $b_{min,v} \leq 0$ and $b_{min,w} \leq 0$. It is noted that a value (e.g. $t_{min,scaled}$ or $t_{max,scaled}$) is non-positive if it is less than zero or if it is equal to zero. If values of zero are be replaced with very small, but non-zero values as described below, then zeros do not need to be handled as special cases. Furthermore, if $t_{min,scaled}$ and $t_{max,scaled}$ cannot equal zero then the determination of whether $t_{min,scaled} \leq 0$ and $t_{max,scaled} \leq 0$ can be performed simply by checking the sign bits of $t_{min,scaled}$ and $t_{max,scaled}$. If the minimum and maximum culling distances are both negative for a ray then the ray is only validly present in the all-negative octant of the coordinate system. In this situation, if $b_{min,u} \leq 0$, $b_{min,v} \leq 0$ and $b_{min,w} \leq 0$ then the box at least partially overlaps with the all-negative octant of the coordinate system, so the intersection test is not rejected in step S311 and the method carries on to step S312 as described above. However, if one or more of $b_{min,u} > 0$, $b_{min,v} > 0$ and $b_{min,w} > 0$ then the box is not present in the all-negative octant of the coordinate system, so it can be determined that the ray misses the box without performing steps S312 to S322, and the method passes from step S311 to step S324. In the 2D example shown in FIG. 7, the minimum and maximum culling distances for the ray 706 are both negative. This means that the ray 706 is only validly present within the negative quadrant of the u,v coordinate system. The boxes 714 and 716 both have $b_{min,u} \leq 0$ and $b_{min,v} \leq 0$, so they both at least partially overlap with the negative quadrant, so the early rejection test cannot determine whether the ray 706 intersects or misses boxes 714 or 716, and the method will pass from step S311 to step S312 in these situations. However, box 710 has $b_{min,u} > 0$ and $b_{min,v} > 0$, which means that box 710 does not overlap with the negative quadrant of the u,v coordinate system (because all of the positions within the box 710 have positive u and v components), so it can be determined in step S311 that the ray 706 does not intersect the box 710, and the method will pass from step S311 to step S324 in this situation. Similarly, box 712 has $b_{min,v} > 0$, which means that box 712 does not overlap with the negative quadrant of the u,v coordinate system (because all of the positions within the box 712 have positive v components), so it can be determined in step S311 that the ray 706 does not intersect the box 712, and the method will pass from step S311 to step S324 in this situation. Similarly, box 718 has $b_{min,u} > 0$, which means that box 718 does not overlap with the negative quadrant of the u,v coordinate system (because all of the positions within the box 718 have positive u components), so it can be determined in step S311 that the ray 706 does not intersect the box 718, and the method will pass from step S311 to step S324 in this situation.

If the minimum culling distance is non-positive and the maximum culling distance is non-negative (i.e. if $t_{min,scaled} \leq 0$ and $t_{max,scaled} \geq 0$) then the early rejection test of step S311 can involve determining whether either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$. If the minimum culling distance is negative and the maximum culling distance is positive for a ray then the ray is validly present in the all-negative octant and in the all-positive octant of the coordinate system. In this situation, if $b_{max,u} \geq 0$, $b_{max,v} \geq 0$ and $b_{max,w} \geq 0$ then the box at least partially overlaps with the all-positive octant of the coordinate system, so the intersection test is not rejected in step S311 and the method carries on to step S312 as described above. Furthermore, in this situation, if $b_{min,u} \leq 0$, $b_{min,v} \leq 0$ and $b_{min,w} \leq 0$ then the box at least partially overlaps with the all-negative octant of the coordinate system, so the intersection test is not rejected in step S311 and the method carries on to step S312 as described above. However, if it is not the case that either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$, then the box is not present in the all-negative octant or in the all-positive octant of the coordinate system, so it can be determined that the ray misses the box without performing steps S312 to S322, and the method passes from step S311 to step S324. In the 2D example shown in FIG. 7, the minimum culling distance for the ray 704 is negative and the maximum culling distance for the ray 704 is positive. This means that the ray 704 is only validly present within the negative quadrant and the positive quadrant of the u,v coordinate system. The boxes 710, 712 and 714 all have $b_{max,u} \geq 0$ and $b_{max,v} \geq 0$, so they all at least partially overlap with the positive quadrant, so the early rejection test cannot determine whether the ray 704 intersects or misses boxes 710, 712 or 714, and the method will pass from step S311 to step S312 in these situations. Furthermore, the box 716 has $b_{min,u} \leq 0$ and $b_{min,v} \leq 0$, so it at least partially overlaps with the negative quadrant, so the early rejection test cannot determine whether the ray 704 intersects or misses box 716, and the method will pass from step S311 to step S312 in these situations. However, box 718 has $b_{max,v} < 0$ and $b_{min,u} > 0$, which means that box 718 does not overlap with the positive quadrant or the negative quadrant of the u,v coordinate system (because all of the positions within the box 718 have positive u components and negative v components), so it can be determined in step S311 that the ray 704 does not intersect the box 718, and the method will pass from step S311 to step S324 in this situation.

If the minimum culling distance is positive and the maximum culling distance is negative (i.e. if $t_{min,scaled} > 0$ and $t_{max,scaled} < 0$) then the ray is not validly present anywhere, so the early rejection test of step S311 determines that the ray misses the box (any box) in this situation. In other words, in this situation, it can be determined that the ray misses the box without performing steps S312 to S322, and the method passes from step S311 to step S324. Alternatively, this scenario may be identified when the ray data is first obtained (e.g. in step S302) such that the ray is deemed invalid (since all intersections tests will automatically fail) and traversal is terminated.

The method is described above for use in a ray tracing system which does not introduce any errors into its calculations. However, some calculations, e.g. calculations performed using numbers in a floating point format may introduce rounding errors. This is partly because the precision with which floating point numbers can be represented varies for numbers of different magnitudes. The 'steps' between sequential floating point numbers are generally approximately proportional to the magnitude of the floating point values (with some exceptions, e.g. in the neighbourhood of zero). In some examples, the intersection testing module of the intersection testing module 108 is configured to operate conservatively when testing AABBs for intersection with rays. In order to ensure that the method is conservative with respect to rounding errors that can be introduced during intersection testing of the ray with the box, the intersection testing module 108 (e.g. the box intersection testing unit(s) 112 or the instance transform unit 118) can do one or both of: (i) expand an effective size of a box (e.g. as part of step S304), and (ii) implement 'lossy comparisons' which allow for some tolerance in the comparison. By ensuring that the box testing is conservative using one or both of these techniques, low accuracy multipliers can be implemented (which can have reduced silicon area, reduced latency and/or reduced power consumption compared to higher accuracy multipliers) without causing rendering errors.

Furthermore, as described above, the ray tracing system (in particular the triangle intersection testing unit(s) 114) is configured to perform a polygon intersection testing process for a ray in respect of geometry bounded by a leaf node of a hierarchical acceleration structure which the ray is determined to intersect. The polygon intersection testing process determines whether the ray intersects one or more polygons defining the geometry. In some examples, the intersection testing module may comprise one or more procedural tester units for performing intersection testing of rays with respect to procedural primitives. The amount by which the box is expanded may take into account any errors that may be introduced during the box intersection testing process and the polygon intersection testing process (and the procedural primitive testing process (if any)). In particular, an effective size of a box may be expanded to ensure that the overall ray tracing method is conservative with respect to rounding errors that can be introduced during intersection testing of the ray with the box and with respect to rounding errors that can be introduced in the polygon intersection testing process (and with respect to rounding errors that can be introduced in the procedural primitive intersection testing process (if any)).

For example, the components defining the positions of the front-facing planes of the box ($b_{min,u}$, $b_{min,v}$ and $b_{min,w}$) can be shifted towards negative infinity by a small amount, and the components defining the positions of the back-facing planes of the box ($b_{max,u}$, $b_{max,v}$ and $b_{max,w}$) can be shifted towards positive infinity by a small amount. This will increase the size of the box, such that a ray is more likely to intersect a box. The amount by which the positions of the planes of the box are shifted depends upon the magnitude of possible rounding errors that may be introduced in the box intersection testing unit(s) 112 and the triangle intersect testing unit(s) 114 (and the procedural tester units (if any)). In particular, the size of the box is expanded by enough so that if a ray will be determined (by the triangle intersection testing unit(s) 114) to intersect a triangle then it will definitely be found to intersect a box that bounds the triangle (by the box intersection testing unit(s) 112). This can avoid some rendering errors due to rounding errors. However, beyond this point, the size of the box is not expanded unnecessarily because expanding the box will increase the number of intersection tests that are performed. A small loss in efficiency due to a small increase to the number of tests to be performed due to the box expansion (e.g. increasing the number of tests by approximately 1%) is acceptable. The box expansion avoids rendering errors which may occur if a ray is determined to miss a box even though it may have been found to intersect on object bounded by the box. Rendering errors are not normally acceptable.

As described above, as well as expanding the size of the box, to ensure that the box intersection testing is conservative and does not introduce rendering errors due to rounding errors in the box intersection testing process and/or the triangle intersection testing process (and/or in the procedural primitive testing process (if any)), the comparisons can be performed as lossy comparisons, such that some tolerance is added to the values being compared. For example, the scaled minimum and scaled maximum culling distances can be shifted to increase the effective valid length of the ray for the purposes of performing box intersection testing. In the examples described above which do not consider the conservatism of the box intersection testing process, the scaled minimum culling distance, $t_{min,scaled}$, is determined as $t_{min,scaled} = D_w t_{min,unscaled}$ or more generally as $t_{min,scaled} = AD_w t_{min,unscaled}$, where A is a scalar value.

However, when the conservatism of the box intersection testing process is considered, the scaled minimum culling distance, $t_{min,scaled}$, may be determined as $t_{min,scaled} = D_w t_{min,unscaled} + B$ or more generally as $t_{min,scaled} = AD_w t_{min,unscaled} + B$, where A and B are scalar values (e.g. scalar constants), and where $B \leq 0$. If B=0 then this is the same as the non-conservative approach described above. In conservative approaches B<0, so the minimum scaled culling distance is reduced, thereby extending the valid range of the ray.

In the examples described above which do not consider the conservatism of the box intersection testing process, the scaled maximum culling distance, $t_{max,scaled}$, is determined as $t_{max,scaled} = D_w t_{max,unscaled}$ or more generally as $t_{max,scaled} =$ $AD_w t_{max,unscaled}$, where A is a scalar value. However, when the conservatism of the box intersection testing process is considered, the scaled maximum culling distance, $t_{max,scaled}$, may be determined as $t_{max,scaled}=D_w t_{max,unscaled}+C$ or more generally as $t_{max,scaled}=AD_w t_{max,unscaled}+C$, where A and C are scalar values (e.g. scalar constants), and where C≥0. If C=0 then this is the same as the non-conservative approach described above. In conservative approaches C>0, so the maximum scaled culling distance is increased, thereby extending the valid range of the ray.

The amount by which the scaled minimum and maximum culling distances are shifted depends upon the magnitude of possible rounding errors that may be introduced in the box intersection testing unit(s) 112 and the triangle intersect testing unit(s) 114 (and any procedural tester units if there are any in the intersection testing module 108). In particular, the scaled minimum and maximum culling distances are shifted by enough so that if a ray will be determined (by the triangle intersection testing unit(s) 114) to intersect a triangle then it will definitely be found to intersect a box that bounds the triangle (by the box intersection testing unit(s) 112). As described above, this can avoid some rendering errors due to rounding errors. However, beyond this point, the scaled minimum and maximum culling distances are not shifted unnecessarily because increasing the valid range of the ray will increase the number of intersection tests that are performed.

In the examples described above, it is possible for some of the values to be zero and/or infinity. In hardware configured to perform calculations on floating point values, values of zero and infinity must be treated as exceptions which is generally inefficient to implement (e.g. in terms of silicon area, processing latency and/or power consumption). Furthermore, values of zero and/or infinity can lead to undefined results, e.g. a value of 0/0 is undefined and a value of 0 multiplied by ∞ is undefined, which may be treated as special cases as described above, otherwise they can lead to errors in the box intersection testing and the triangle intersection testing processes. For example, if the result of a calculation (e.g. a multiplication) is undefined then this can lead to errors when comparing the results of two calculations.

In the examples described above, it is possible for any of the box components $b_{min,u}$, $b_{max,u}$, $b_{min,v}$, $b_{max,v}$, $b_{min,w}$ or $b_{max,w}$ to be zero. In the first example described above in which the scaled ray components are $$\rho_u = \left|\frac{D_u}{D_w}\right|, \rho_v = \left|\frac{D_v}{D_w}\right| \text{ and } \rho_w = \left|\frac{D_w}{D_w}\right| = 1,$$

it is possible for the values of $\rho_u$ and $\rho_v$ to be zero. It is again noted that due to the selective permutation of the axes $|D_w|\geq|D_u|$ and $|D_w|\geq|D_v|$, so $0\leq\rho_u\leq1$ and $0\leq\rho_v\leq1$ in this example. So, to avoid having to handle zeros as exceptions, and to avoid errors that zeros may introduce, if the magnitude of any of the $b_{min,u}$, $b_{max,u}$, $b_{min,v}$, $b_{max,v}$, $b_{min,w}$, $b_{max,w}$, $\rho_u$ or $\rho_v$ values is zero then the magnitude of that value can be set to be equal to a non-zero substitute value which is small enough that it would behave like zero in an operation in which two of the cross-multiplication values (e.g. $\rho_v b_{min,u}$ and $\rho_u b_{min,v}$) are determined and compared (e.g. as in step S502). The non-zero substitute value is outside of the representable range of values in the format in which the values of $b_{min,u}$, $b_{max,u}$, $b_{min,v}$, $b_{max,v}$, $b_{min,w}$, $b_{max,w}$, $\rho_u$ or $\rho_v$ are represented. For example, if the values are represented with a floating point format, then there is a minimum non-zero magnitude, $f_L$, which can be represented in that floating point format. There is also a maximum finite magnitude, $f_U$, which can be represented in that floating point format. The small non-zero substitute value is smaller than $f_L$, and for example may be smaller than $$\frac{f_L^2}{f_U}$$

so that it behaves like zero in an operation in which two of the cross-multiplication values (e.g. $\rho_v b_{min,u}$ and $\rho_u b_{min,v}$) are determined and compared (as in step S502) in the sense that the result of the comparison is the same for any sets of finite inputs whether or not the substitution is performed. In order to represent this small non-zero substitute value, the exponent range may be expanded relative to the exponent range of the input floating point format. Expanding the exponent range (i.e. increasing the number of bits used to represent the exponents of the values) may increase the bit widths of the values that are operated on in the hardware, but it can simplify the hardware by avoiding having to treat zeros as exceptions, and it can avoid errors introduced by undefined results. In some examples, substitutions may be made for only one of the set of box planes ($b_{min,u}$, $b_{max,u}$, $b_{min,v}$, $b_{max,v}$, $b_{min,w}$, $b_{max,w}$) or ray direction components ($\rho_u$, $\rho_v$), since the special case of e.g. $\rho_v \cdot b_{min,u}=0 \cdot 0$ cannot occur if at least one of the factors can be guaranteed to be nonzero. In other examples, substitutions occur for both sets, but distinct values are substituted for box planes as opposed to ray direction components, such that zero is removed from calculations, but an order of precedence is maintained between box planes and ray direction components (e.g. such that $|b_{min,u}|<<\rho_v$ whenever $|b_{min,u}|=0$ (prior to substitution), even if $\rho_v=0$ (prior to substitution)).

In the second example described above in which the scaled inverse ray components are $$\rho_u = \left|\frac{AD_w}{D_u}\right|, \rho_v = \left|\frac{AD_w}{D_v}\right| \text{ and } \rho_w = \left|\frac{AD_w}{D_w}\right| = |A|,$$

where A is non-zero and finite, it is possible for the values of $\rho_u$ and $\rho_v$ to be infinity. It is again noted that due to the selective permutation of the axes $|D_w|\geq|D_u|$ and $|D_w|\geq|D_v|$, so $1\leq\rho_u\leq\infty$ and $1\leq\rho_v\leq\infty$ in this example. To avoid having to handle zeros as exceptions, and to avoid errors that zeros may introduce, if the magnitude of any of the $b_{min,u}$, $b_{max,u}$, $b_{min,v}$, $b_{max,v}$, $b_{min,w}$, or $b_{max,w}$ values is zero then the magnitude of that value can be set to be equal to a non-zero substitute value which is small enough that it would behave like zero in an operation in which two of the scaled intersection distances (e.g. $\rho_u b_{min,u}$ and $\rho_v b_{min,v}$) are determined and compared (e.g. as in steps S602, S604 and S606). As described above, the non-zero substitute value is outside of the representable range of values in the format in which the values of $b_{min,u}$, $b_{max,u}$, $b_{min,v}$, $b_{max,v}$, $b_{min,w}$, $b_{max,w}$, $\rho_u$ or $\rho_v$ are represented, and may for example have a magnitude that is smaller than $$\frac{f_L^2}{f_U}.$$

Similarly, to avoid having to handle infinities as exceptions, and to avoid errors that infinities may introduce, if the magnitude of the ρu value or the ρv value is infinity then the magnitude of that value can be set to be equal to a finite substitute value which is large enough that it would behave like infinity in an operation in which two of the scaled intersection distances (e.g. $\rho_u b_{min,u}$ and $\rho_v b_{min,v}$) are determined and compared (e.g. as in steps S602, S604 and S606). The finite substitute value is outside of the representable range of values in the format in which the values of $b_{min,u}$, $b_{max,u}$, $b_{min,v}$, $b_{max,v}$, $b_{min,w}$, $b_{max,w}$, $\rho_u$ or $\rho_v$ are represented, and may for example have a magnitude that is larger than $$\frac{f_U^2}{f_L}$$

so that it behaves like infinity in an operation in which two of the scaled intersection distances are determined and compared. In order to represent the small non-zero substitute values and the large finite substitute values, the exponent range may be expanded relative to the exponent range of the input floating point format. Expanding the exponent range (i.e. increasing the number of bits used to represent the exponents of the values) may increase the bit widths of the values that are operated on in the hardware, but it can simplify the hardware by avoiding having to treat zeros and infinities as exceptions, and it can avoid errors introduced by undefined results. In some examples, substitutions may be made for only one of the set of box planes ($b_{min,u}$, $b_{max,u}$, $b_{min,v}$, $b_{max,v}$, $b_{min,w}$, $b_{max,w}$) or ray direction components ($\rho_u$, $\rho_v$), since the special case of e.g. $\rho_u \cdot b_{min,u} = \infty \cdot 0$ cannot occur if at least one of the factors can be guaranteed to be nonzero/non-infinite. In other examples, substitutions occur for both sets, such that exception handling can be reduced, but in such a way so as to maintain a precedence between box planes and ray direction components (e.g. such that $\rho_u \cdot b_{min,u} = 0$ if $\rho_u = \infty$ and $b_{min,u} = 0$ (prior to substitution)).

In some examples, a top-level acceleration structure (TLAS) may be used to represent a scene in a world space coordinate system. Nodes of the TLAS correspond to boxes (e.g. AABBs which are aligned to the axes of the world space coordinate system) representing regions in the scene. A set of geometry (e.g. representing an object) may be defined and one or more instances of the set of geometry can be inserted into respective positions within the scene. The set of geometry is defined in an instance space coordinate system, and a bottom-level acceleration structure (BLAS) is created with nodes corresponding to boxes (e.g. AABBs which are aligned to the axes of the instance space coordinate system) representing regions in the instance space. One or more nodes of the TLAS may reference nodes of a BLAS. A ray first traverses nodes of the TLAS, wherein if the ray is found to intersect with a node that references a node of a BLAS then the ray can be tested for intersection with boxes corresponding to nodes of the BLAS. The intersection testing module 108 (e.g. the instance transform unit 118) can transform the ray into the instance space coordinate system in order to be tested for intersection with boxes corresponding to nodes of the BLAS. The boxes described herein could correspond to nodes of a TLAS (i.e. the boxes could be axis-aligned boxes in world space), or the boxes described herein could correspond to nodes of a BLAS (i.e. the boxes could be axis-aligned boxes in an instance space).

Figure 8:
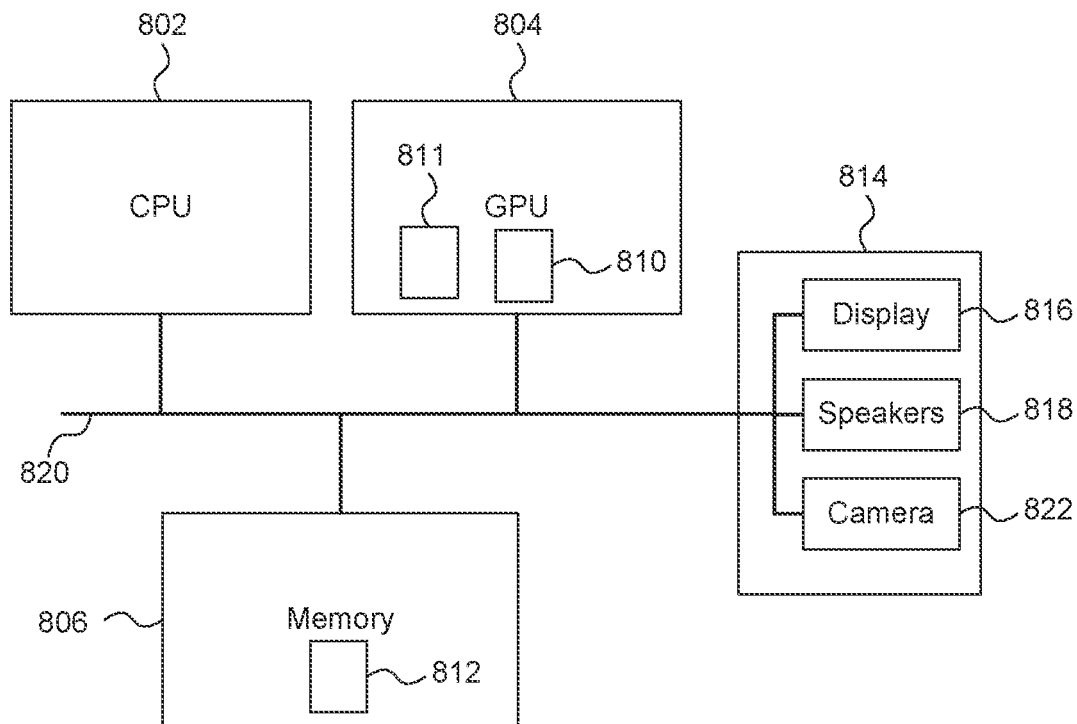
FIG. 8 shows a computer system in which a ray tracing system is implemented.

FIG. 8 shows a computer system in which the ray tracing systems described herein may be implemented. The computer system comprises a CPU 802, a GPU 804, a memory 806 and other devices 814, such as a display 816, speakers 818 and a camera 822. A ray tracing unit 810 (corresponding to ray tracing unit 102) is implemented on the GPU 804, as well as a Neural Network Accelerator (NNA) 811. In other examples, the ray tracing unit 810 may be implemented on the CPU 802 or within the NNA 811 or as a separate processing unit in the computer system. The components of the computer system can communicate with each other via a communications bus 820. A store 812 (corresponding to memory 104) is implemented as part of the memory 806.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The intersection testing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing module configured to perform any of the methods described herein, or to manufacture an intersection testing module comprising any apparatus described herein. An integrated circuit definition dataset may be, for example, an integrated circuit description.

Therefore, there may be provided a method of manufacturing, at an integrated circuit manufacturing system, an intersection testing module as described herein. Furthermore, there may be provided an integrated circuit definition dataset that, when processed in an integrated circuit manufacturing system, causes the method of manufacturing an intersection testing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing module will now be described with respect to FIG. 9.

Figure 9:
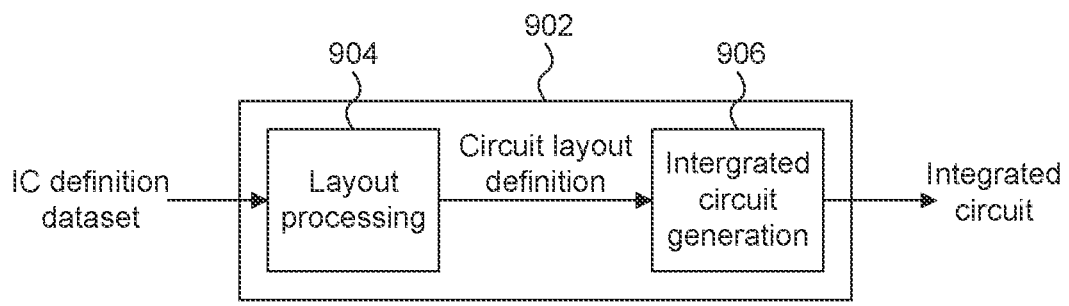
FIG. 9 shows an integrated circuit manufacturing system for generating an integrated circuit embodying a ray tracing system.

FIG. 9 shows an example of an integrated circuit (IC) manufacturing system 902 which is configured to manufacture an intersection testing module as described in any of the examples herein. In particular, the IC manufacturing system 902 comprises a layout processing system 904 and an integrated circuit generation system 906. The IC manufacturing system 902 is configured to receive an IC definition dataset (e.g. defining an intersection testing module as described in any of the examples herein), process the IC definition dataset, and generate an IC according to the IC definition dataset (e.g. which embodies an intersection testing module as described in any of the examples herein). The processing of the IC definition dataset configures the IC manufacturing system 902 to manufacture an integrated circuit embodying an intersection testing module as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:
   determining scaled inverse ray components $\rho_u$ and $\rho_v$, wherein $$\rho_u = \left|\frac{AD_w}{D_u}\right| \text{ and } \rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector such that $|D_w| \geq |D_u|$ and $|D_w| \geq |D_v|$, and wherein A is a scalar value;
   determining a scaled minimum culling distance, $t_{min,scaled}$, using a result of multiplying an unscaled minimum culling distance for the ray, $t_{min,unscaled}$, by the magnitude of $AD_w$;
   determining a scaled maximum culling distance, $t_{max,scaled}$, using a result of multiplying an unscaled maximum culling distance for the ray, $t_{max,unscaled}$, by the magnitude of $AD_w$;
   determining scaled intersection distances to the planes defining the box using the scaled inverse ray components;
   identifying the largest of the determined scaled intersection distances to a front-facing plane of the box;
   identifying the smallest of the determined scaled intersection distances to a back-facing plane of the box;
   determining whether:
      (i) the identified largest scaled intersection distance to a front-facing plane of the box is no greater than the identified smallest scaled intersection distance to a back-facing plane of the box;
      (ii) the identified largest scaled intersection distance to a front-facing plane of the box is no greater than the scaled maximum culling distance, $t_{max,scaled}$; and
      (iii) the identified smallest scaled intersection distance to a back-facing plane of the box is no less than the scaled minimum culling distance, $t_{min,scaled}$; and
   determining that the ray intersects the box if all of the three determinations (i) to (iii) are satisfied, and determining that the ray misses the box if one or more of the three determinations (i) to (iii) are not satisfied.

2. The method of claim 1, wherein A=1.

3. The method of claim 1, wherein the box represents a volume defined by a front-facing plane and a back-facing plane for each of the dimensions, u, v and w, of the three-dimensional axis-aligned box, wherein $b_{min,u}$ is a constant u component value of the front-facing plane for the u dimension, $b_{max,u}$ is a constant u component value of the back-facing plane for the u dimension, $b_{min,v}$ is a constant v component value of the front-facing plane for the v dimension, $b_{max,v}$ is a constant v component value of the back-facing plane for the v dimension, $b_{min,w}$ is a constant w component value of the front-facing plane for the w dimension, and $b_{max,w}$ is a constant w component value of the back-facing plane for the w dimension,
   wherein said determining scaled intersection distances to the planes defining the box using the scaled inverse ray components comprises:
      determining a scaled intersection distance $\tau_{u,min}$ to the front-facing plane for the u dimension by multiplying $b_{min,u}$ and $\rho_u$;
      determining a scaled intersection distance $\tau_{u,max}$ to the back-facing plane for the u dimension by multiplying $b_{max,u}$ and $\rho_u$;
      determining a scaled intersection distance $\tau_{v,min}$ to the front-facing plane for the v dimension by multiplying $b_{min,v}$ and $\rho_v$;
      determining a scaled intersection distance $\tau_{v,max}$ to the back-facing plane for the v dimension by multiplying $b_{max,v}$ and $\rho_v$;
      determining a scaled intersection distance $\tau_{w,min}$ to the front-facing plane for the w dimension, such that $\tau_{w,min} = b_{min,w} \rho_w$;
      determining a scaled intersection distance $\tau_{w,max}$ to the back-facing plane for the w dimension, such that $T_{w,max} = b_{max,w} \rho_w$.

4. The method of claim 3, further comprising:
if the magnitude of any of the $b_{min,u}$, $b_{max,u}$, $b_{min,v}$, $b_{max,v}$, $b_{min,w}$, or $b_{max,w}$ values is zero then setting the magnitude of that value to be equal to a non-zero substitute value which is small enough that it would behave like zero in an operation in which two of said scaled intersection distances are determined and compared; and if the magnitude of the $\rho_u$ value or the $\rho_v$ value is infinity then setting the magnitude of that value to be equal to a finite substitute value which is large enough that it would behave like infinity in an operation in which two of said scaled intersection distances are determined and compared.

5. The method of claim 3, further comprising subtracting respective components of an origin of the ray from respective components defining the positions of the front-facing planes and the back-facing planes of the box to thereby determine the values of $b_{min,u}$, $b_{max,u}$, $b_{min,v}$, $b_{max,v}$, $b_{min,w}$ and $b_{max,w}$.

6. The method of claim 1, wherein the ray direction vector is defined with components $D_x$, $D_y$ and $D_z$ in a space-coordinate system, and wherein the method further comprises selectively permuting the x, y and z components of the ray and the components of the box to determine how the x, y and z components of the space-coordinate system map onto the u, v and w dimensions, to thereby ensure that $D_w$ is the major component of the ray direction vector such that $|D_w| \geq |D_u|$ and $|D_w| \geq |D_v|$.

7. The method of claim 1, further comprising selectively reversing the axes for the components of the ray and the axis-aligned box, such that $D_u \geq 0$, $D_v \geq 0$ and $D_w \geq 0$.

8. The method of claim 3, further comprising:
selectively reversing the axes for the components of the ray and the axis-aligned box, such that $D_u \geq 0$, $D_v \geq 0$ and $D_w \geq 0$;

if $t_{min,scaled} \geq 0$ and $t_{max,scaled} \geq 0$, determining whether $b_{max,u} \geq 0$, $b_{max,v} \geq 0$ and $b_{max,w} \geq 0$, wherein said determining scaled intersection distances to the planes defining the box is performed in response to determining that $b_{max,u} \geq 0$, $b_{max,v} \geq 0$ and $b_{max,w} \geq 0$, wherein if any of $b_{max,u}$, $b_{max,v}$ and $b_{max,w}$ are less than zero then it is determined that the ray misses the box without determining scaled intersection distances to the planes defining the box;

if $t_{min,scaled} \leq 0$ and $t_{max,scaled} \leq 0$, determining whether $b_{min,u} \leq 0$, $b_{min,v} \leq 0$ and $b_{min,w} \leq 0$, wherein said determining scaled intersection distances to the planes defining the box is performed in response to determining that $b_{min,u} \leq 0$, $b_{min,v} \leq 0$ and $b_{min,w} \leq 0$, wherein if any of $b_{min,u}$, $b_{min,v}$ and $b_{min,w}$ are greater than zero then it is determined that the ray misses the box without determining scaled intersection distances to the planes defining the box;

if $t_{min,scaled} \leq 0$ and $t_{max,scaled} \geq 0$, determining whether either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$, wherein said determining scaled intersection distances to the planes defining the box is performed in response to determining that either: (i) $b_{min,u} \leq 0$, $b_{min,v} \leq 0$ and $b_{min,w} \leq 0$, or (ii) $b_{max,u} \geq 0$, $b_{max,v} \geq 0$ and $b_{max,w} \geq 0$, wherein if both: (i) any of $b_{min,u}$, $b_{min,v}$ and $b_{min,w}$ are greater than zero, and (ii) any of $b_{max,u}$, $b_{max,v}$ and $b_{max,w}$ are less than zero, then it is determined that the ray misses the box without determining scaled intersection distances to the planes defining the box; and/or if $t_{min,scaled} \geq 0$ and $t_{max,scaled} \leq 0$, determining that the ray misses the box without determining scaled intersection distances to the planes defining the box.

9. The method of claim 1, wherein the determined scaled inverse ray components, the determined scaled minimum culling distance and the determined scaled maximum culling distance for the ray are used to determine whether the ray intersects a plurality of axis-aligned boxes in the ray tracing system.

10. The method of claim 1, wherein the three determinations (i) to (iii) are performed in parallel.

11. The method of claim 1, further comprising outputting an indication of a result of the determination of whether the ray intersects the axis-aligned box, wherein the outputted indication is used in the ray tracing system for rendering an image of a 3D scene.

12. The method of claim 1, wherein the axis-aligned box is an axis-aligned bounding box which bounds geometry to be rendered, and wherein the axis-aligned box corresponds to a node of a hierarchical acceleration structure to be used for performing intersection testing in the ray tracing system.

13. The method of claim 12, wherein the node is part of a bottom-level acceleration structure (BLAS) for representing geometry in an instance space, and wherein the method comprises transforming the ray into the instance space.

14. The method of claim 12, wherein the ray tracing system is configured to perform a polygon intersection testing process for a ray in respect of geometry bounded by a leaf node of the hierarchical acceleration structure which the ray is determined to intersect, wherein the polygon intersection testing process determines whether the ray intersects one or more polygons defining the geometry.

15. The method of claim 1, further comprising expanding an effective size of the box to ensure that the method is conservative with respect to rounding errors that can be introduced during intersection testing of the ray with the box.

16. The method of claim 14, further comprising expanding an effective size of the box to ensure that the method is conservative with respect to rounding errors that can be introduced during intersection testing of the ray with the box and with respect to rounding errors that can be introduced in the polygon intersection testing process.

17. The method of claim 1, wherein the scaled minimum culling distance, $t_{min,scaled}$, is determined as $t_{min,scaled} = AD_w t_{min,unscaled} + B$, wherein B is a scalar value and wherein $B \leq 0$; and wherein the scaled maximum culling distance, $t_{max,scaled}$, is determined as $t_{max,scaled} = AD_w t_{max,unscaled} + C$, wherein C is a scalar value and wherein $C \geq 0$.

18. The method of claim 17, wherein $B < 0$ and $C > 0$.

19. An intersection testing module, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:

determine scaled inverse ray components $\rho_u$ and $\rho_v$, wherein $$\rho_u = \left|\frac{AD_w}{D_u}\right| \text{ and } \rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector such that $|D_w|\geq|D_u|$ and $|D_w|\geq|D_v|$, and wherein A is a scalar value;
   determine a scaled minimum culling distance, $t_{min,scaled}$, using a result of multiplying an unscaled minimum culling distance for the ray, $t_{min,unscaled}$, by the magnitude of $AD_w$;
   determine a scaled maximum culling distance, $t_{max,scaled}$, using a result of multiplying an unscaled maximum culling distance for the ray, $t_{max,unscaled}$, by the magnitude of $AD_w$;
   determine scaled intersection distances to the planes defining the box using the scaled inverse ray components;
   identify the largest of the determined scaled intersection distances to a front-facing plane of the box;
   identify the smallest of the determined scaled intersection distances to a back-facing plane of the box;
   determine whether:
      (i) the identified largest scaled intersection distance to a front-facing plane of the box is no greater than the identified smallest scaled intersection distance to a back-facing plane of the box;
      (ii) the identified largest scaled intersection distance to a front-facing plane of the box is no greater than the scaled maximum culling distance, $t_{max,scaled}$; and
      (iii) the identified smallest scaled intersection distance to a back-facing plane of the box is no less than the scaled minimum culling distance, $t_{min,scaled}$; and
   determine that the ray intersects the box if all of the three determinations (i) to (iii) are satisfied, and determine that the ray misses the box if one or more of the three determinations (i) to (iii) are not satisfied.

20. A non-transitory computer readable storage medium having stored thereon an integrated circuit definition dataset that, when processed in an integrated circuit manufacturing system, configures the integrated circuit manufacturing system to manufacture an intersection testing module which is configured for use in a ray tracing system, the intersection testing module being configured to determine whether a ray intersects a three-dimensional axis-aligned box, wherein the box represents a volume defined by a front-facing plane and a back-facing plane for each dimension of the three-dimensional axis-aligned box, the intersection testing module being configured to:
   determine scaled inverse ray components $\rho_u$ and $\rho_v$, wherein $$\rho_u = \left|\frac{AD_w}{D_u}\right| \text{ and } \rho_v = \left|\frac{AD_w}{D_v}\right|,$$

wherein a third scaled inverse ray component $$\rho_w = \left|\frac{AD_w}{D_w}\right| = |A|,$$

wherein $D_u$, $D_v$ and $D_w$ are components of a ray direction vector, D, for the ray, wherein $D_w$ is the major component of the ray direction vector such that $|D_w|\geq|D_u|$ and $|D_w|\geq|D_v|$, and wherein A is a scalar value;
   determine a scaled minimum culling distance, $t_{min,scaled}$, using a result of multiplying an unscaled minimum culling distance for the ray, $t_{min,unscaled}$, by the magnitude of $AD_w$;
   determine a scaled maximum culling distance, $t_{max,scaled}$, using a result of multiplying an unscaled maximum culling distance for the ray, $t_{max,unscaled}$, by the magnitude of $AD_w$;
   determine scaled intersection distances to the planes defining the box using the scaled inverse ray components;
   identify the largest of the determined scaled intersection distances to a front-facing plane of the box;
   identify the smallest of the determined scaled intersection distances to a back-facing plane of the box;
   determine whether:
      (i) the identified largest scaled intersection distance to a front-facing plane of the box is no greater than the identified smallest scaled intersection distance to a back-facing plane of the box;
      (ii) the identified largest scaled intersection distance to a front-facing plane of the box is no greater than the scaled maximum culling distance, $t_{max,scaled}$; and
      (iii) the identified smallest scaled intersection distance to a back-facing plane of the box is no less than the scaled minimum culling distance, $t_{min,scaled}$; and
   determine that the ray intersects the box if all of the three determinations (i) to (iii) are satisfied, and determine that the ray misses the box if one or more of the three determinations (i) to (iii) are not satisfied.

\* \* \* \* \*